(12) United States Patent  
Hudson et al.

(10) Patent No.: US 8,618,761 B2  
(45) Date of Patent: Dec. 31, 2013

(54) METHOD FOR CONTROLLING MOTOR OPERATION USING INFORMATION CHARACTERIZING REGIONS OF MOTOR OPERATION

(75) Inventors: Christopher Allen Hudson, Blacksburg, VA (US); Nimal Lobo, Blacksburg, VA (US); Krishnan Ramu, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 13/296,412

(22) Filed: Nov. 15, 2011

(65) Prior Publication Data

US 2012/0056570 A1 Mar. 8, 2012

Related U.S. Application Data

(62) Division of application No. 11/718,325, filed as application No. PCT/US2005/039432 on Oct. 31, 2005, now Pat. No. 8,080,964.

(60) Provisional application No. 60/622,968, filed on Oct. 29, 2004.

(51) Int. Cl.
  *B25J 9/16* (2006.01)
  *G05B 19/18* (2006.01)

(52) U.S. Cl.
  USPC ............. 318/568.11; 318/400.15; 318/432; 318/434

(58) Field of Classification Search
  USPC .................. 318/568.11, 400.15, 432, 434
  See application file for complete search history.

(56) References Cited

U.S. PATENT DOCUMENTS

| | | | |
|---|---|---|---|
| 5,365,158 A | 11/1994 | Tanaka | |
| 5,557,182 A * | 9/1996 | Hollenbeck et al. | ........... 318/432 |
| 6,226,580 B1 * | 5/2001 | Noro et al. | ....................... 701/42 |
| 6,472,842 B1 | 10/2002 | Ehsani | |
| 6,629,089 B1 | 9/2003 | Supino | |
| 6,713,978 B2 | 3/2004 | Parlos | |
| 6,784,565 B2 * | 8/2004 | Wall et al. | ........................ 290/52 |
| 6,922,036 B1 | 7/2005 | Ehsani | |
| 7,178,412 B2 * | 2/2007 | Nallapa | .................... 73/862.326 |
| 8,400,088 B2 * | 3/2013 | De Belie et al. | ......... 318/400.33 |
| 2003/0071594 A1 * | 4/2003 | Kleinau et al. | ................ 318/567 |

(Continued)

OTHER PUBLICATIONS

International Search Report dated Dec. 14, 2006 with Written Opinion.

(Continued)

*Primary Examiner* — Erick Glass
(74) *Attorney, Agent, or Firm* — NSIP Law

(57) ABSTRACT

A method for collecting operational parameters of a motor may include controlling the energization of a phase winding of the motor to establish an operating point, monitoring operational parameters of the motor that characterize a relationship between the energization control applied to the motor's phase winding and the motor's response to this control, and collecting information of the operational parameters for the operating point that characterizes the relationship between the applied energization control and the motor's response. The collected information characterizing the relationship between the applied energization control and the motor's response may be employed by a neural network to estimate the regions of operation of the motor. And a system for controlling the operation of motor may employ this information, the neural network, or both to regulate the energization of a motor's phase winding during a phase cycle.

18 Claims, 17 Drawing Sheets

(56) References Cited

U.S. PATENT DOCUMENTS

2003/0136597 A1* 7/2003 Raftari et al. ............... 180/242
2003/0155885 A1* 8/2003 Zaremba et al. ............. 318/727
2004/0254709 A1* 12/2004 Kustosch et al. ............ 701/70
2005/0067991 A1* 3/2005 El-Ibiary ..................... 318/490
2005/0071095 A1* 3/2005 El-Ibiary ..................... 702/60

2009/0112334 A1 4/2009 Grichnik

OTHER PUBLICATIONS

R. Krishnan, "Switched Reluctance Motor Drives," CRC Press, pp. 1-7, 2001.

* cited by examiner

METHOD FOR CONTROLLING MOTOR OPERATION USING INFORMATION CHARACTERIZING REGIONS OF MOTOR OPERATION

CROSS-REFERENCE TO RELATED APPLICATIONS

This application is a divisional of U.S. patent application Ser. No. 11/718,325, filed Apr. 30, 2007 (§371c date of Apr. 15, 2008), and claims priority to U.S. application 60/622,968, filed on Oct. 29, 2004, international application PCT/US2005/039432, filed on Oct. 31, 2005, and U.S. application Ser. No. 11/718,325, filed on Apr. 30, 2007. The application incorporates by reference the disclosures provided in Applicants' applications Ser. Nos. 11/718,325, 60/622,968, PCT/US2003/16627, PCT/US2003/16628, PCT/US82003/16629, PCT/US2003/16630, and PCT/US2003/16631.

FIELD OF THE INVENTION

The present invention relates to a method and system for collecting characteristic information of a motor, a neural network and method of using the same for estimating regions of motor operation from information characterizing the motor, and system and method for controlling motor operation using the characteristic information, the neural network, or both.

BACKGROUND OF THE RELATED ART

Currently in the motor control industry, engineers require various characteristic electrical and mechanical parameters to design and control motors. The typical parameters necessary to characterize the motor's operation, for any aspect of motor development, are winding current (i), rotor position (θ), torque and speed (ω). The relationship among these parameters provides indicia of the performance of the motor and system.

Related art methods to obtain motor operational parameters, either for design or system development, rely on finite element analysis (FEA) and locked-rotor tests. FEA proves useful in motor design and can be used to develop control methods. However, FEA does not account for parameter distortion arising from influences external to the motor, such as digital signal processing, sampling, or non-linear effects due to noise or Pulse-Width Modulation (PWM) switching. All of these influences are happenstance in typical motor drive systems.

Aside from FEA, the most prevalent method for obtaining motor operational parameters employs the locked-rotor test. According to this method, the motor rotor is locked at a specific position and a voltage is induced across the motor windings. Current and voltage measurements are made for numerous rotor positions, and other parameters, such as inductance and flux-linkage, are derived from the current and voltage measurements. No converter or controller is required to perform these measurements. Once all of the required measurements are taken, the measured and derived data can be used to control the motor. Although the locked-rotor test provides highly accurate results, the measurements are time consuming and may only be obtained through the operation of an actual motor drive.

Currently, there is a trend in the motor drive industry to eliminate rotor position sensors, which are used to provide rotor position information for the control of a motor. Position sensors increase the overall cost and decrease the overall lifetime of the system. In low-cost, high-speed applications like grinders, fans and vacuum cleaners, the presence of a rotor position sensor adds cost to the motor drive system that could be avoided by smart sensor-less based position estimation techniques. Also, for high-temperature and physical disturbance applications, the presence of a position sensor to provide the rotor position is not preferred.

Additional background information on the modeling, analysis, and control of switched reluctance motors (SRMs) and sensor-less control techniques is provided in "Switched Reluctance Motor Drives" by R. Krishnan.

Some sensor-less control methods use motor parameters that are stored in the form of look-up tables within a microcontroller. "Accurate Position Estimation in Switched Reluctance Motor With Prompt Starting", by Debiprasad Panda, and V. Ramanarayanan (IEEE publication) provides a description of state-of-the-art control techniques for sensor-less control of SRMs.

As a substitute for position sensors and look-up tables, artificial neural networks (ANNs) are increasingly being used for inferring a rotor's position using various sensor-less techniques. So far, though, the large size of ANNs has made their implementation in practical low-cost and high-speed systems impossible.

All reference material cited herein is hereby incorporated into this disclosure by reference.

SUMMARY OF THE INVENTION

An object of the present invention is to overcome the above-described problems and limitations of the related art.

Another object of the invention is to provide a method for collecting characteristic information of a motor.

Still another object of the invention is to provide a system for collecting characteristic information of a motor.

A further object of the invention is to provide a neural network for estimating regions of motor operation from information characterizing the motor.

A further object of the invention is to provide a method for estimating regions of motor operation, using a neural network, from information characterizing the motor.

A further object of the invention is to provide a system for controlling motor operation using the characteristic information, the neural network, or both.

A further object of the invention is to provide a method for controlling motor operation using the characteristic information, the neural network, or both.

These and other objects of the invention may be achieved in whole or in part by a method for collecting operational parameters of a motor. According to the method, the energization of a phase winding of the motor is controlled to establish a rotational operating point. Operational parameters of the motor that characterize a relationship between the energization control applied to the motor's phase winding and the motor's response to this control are monitored. And information of the operational parameters, for the operating point, that characterizes the relationship between the applied energization control and the motor's response are collected.

The objects of the invention may also be achieved in whole or in part by a system for collecting operational parameters of a motor. The system includes a power converter that energizes a phase winding of the motor to establish a controlled operating point. Sensors monitor operational parameters of the motor characterizing a relationship between the energization applied to the motor's phase winding and the motor's response to the applied energization. A controller controls the energization applied by the power converter and collects information of the operational parameters for the operating point from the sensors.

The objects of the invention may be further achieved in whole or in part by a neural network that estimates the position of a motor's rotor with respect to its stator. The network includes a preprocessor that produces a substantially non-linear response based on one or more variables. Each of a plurality of neurons produces a response based on a plurality of variables. An input layer of the neural network includes a group of the plurality of neurons and each neuron of the input layer produces a response based on the response produced by the preprocessor. An output layer of the neural network includes one of the plurality of neurons, which produces a response based on the responses produced by the neurons of the input layer.

The objects of the invention may be further achieved in whole or in part by a method for estimating the position of a motor's rotor with respect to its stator using a neural network. The method includes generating a substantially non-linear response based on one or more variables and generating, for each input layer neuron of the network, a response based on a plurality of variables, which include the substantially non-linear response. Also, a network response is generated based on the responses generated by the input layer neurons.

The objects of the invention may be further achieved in whole or in part by a method for controlling a motor. According to the method, the motor's region of operation is estimated and a phase winding of the motor is energized when the region of operation is estimated to be a region for applying motoring torque. A determination is made whether a motoring torque region of operation has been errantly estimated. If the determination is affirmative, the energization of the motor phase winding is discontinued.

The objects of the invention may be further achieved in whole or in part by a system for controlling a motor. The system includes an estimation component that estimates the motor's region of operation and an energization component that energizes a phase winding of the motor when the region of operation is estimated to be a region for applying motoring torque. A determination component determines whether a motoring torque region of operation has been errantly estimated. If the determination is affirmative, the energization component discontinues energizing the motor phase winding.

BRIEF DESCRIPTION OF THE DRAWINGS

Preferred embodiments of the present invention will now be further described in the following paragraphs of the specification and may be better understood when read in conjunction with the attached drawings, in which.

DETAILED DESCRIPTION OF THE INVENTION

Figure 1:
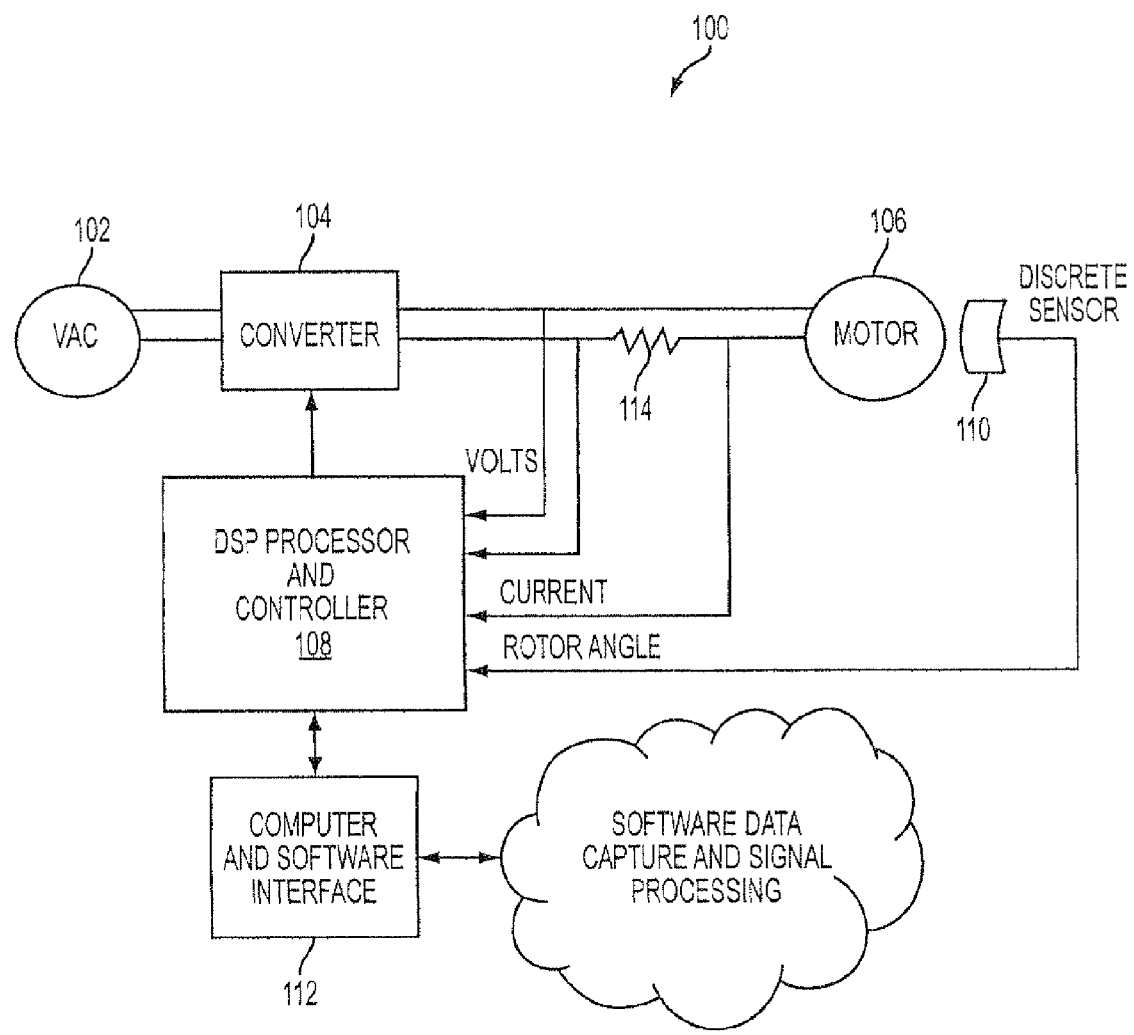
FIG. 1 illustrates a runtime data collection system for a motor.

FIG. 1 illustrates a runtime data collection system 100 for a motor. In system 100, an alternating current (ac) voltage source 102 provides power to a power converter 104. Power converter 104 energizes one or more phase windings of a motor 106 to induce rotational operation of the motor's rotor under the control of a digital signal processor (DSP) controller 108. DSP controller 108 monitors the voltage across, and the current through, one or more phase windings of motor 106 and the rotor angle of motor 106 based on information provided by a sensor 110. A computer 112 communicates with DSP controller 108 to capture and process the monitored voltage, current, and rotor position information.

During runtime operation of motor 106, data samples for parameters such as speed, current (i), flux-linkage ($\lambda$), and rotor position can be collected and stored by computer 112. The data collection can be repeated manually or automatically to achieve data sets over the entire range of operating points for motor 106.

Figure 2:
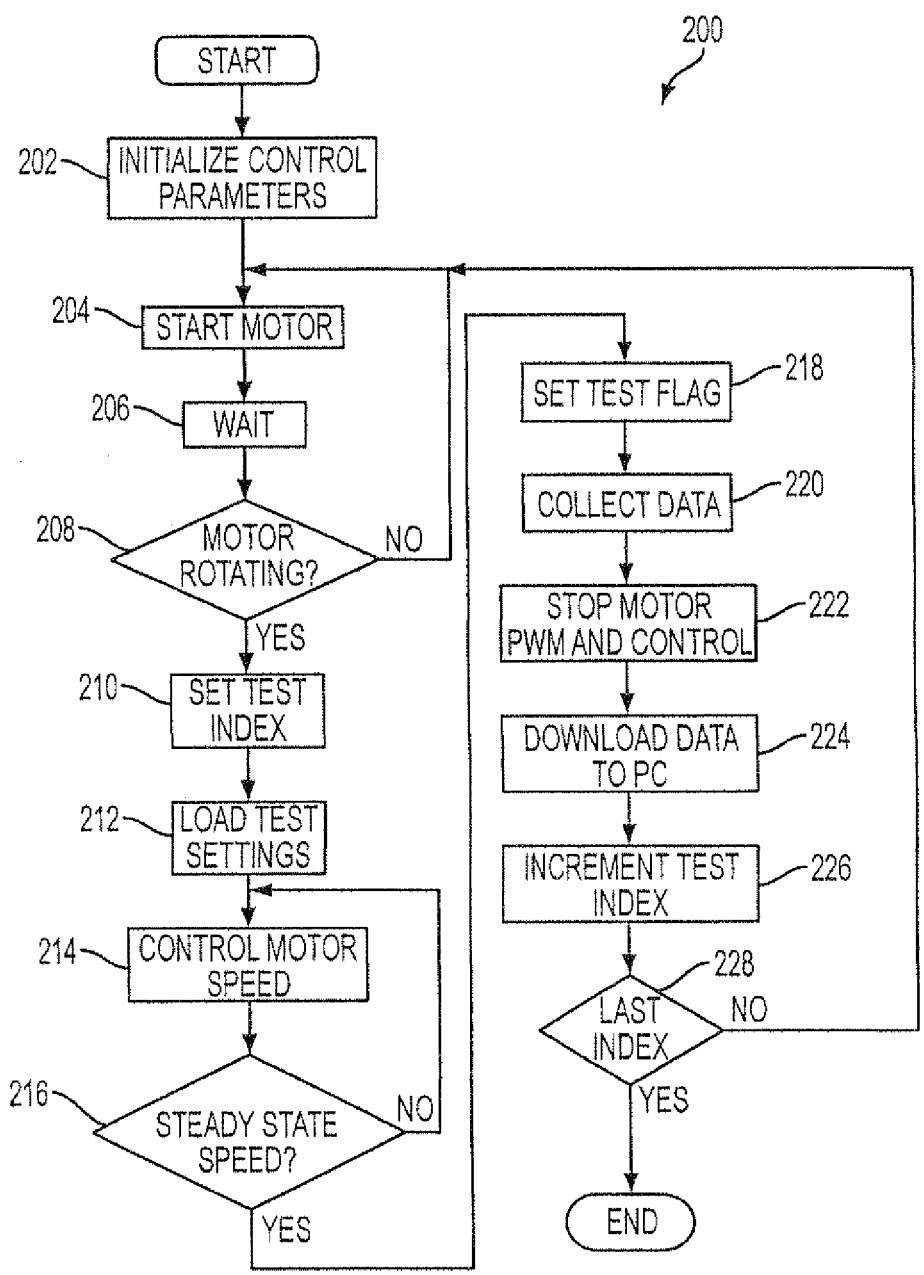
FIG. 2 illustrates an automatic test method for implementing the collection of operational parameters using the system illustrated in FIG. 1.

FIG. 2 illustrates an automatic test method 200 for implementing the collection of operational parameters using the system illustrated in FIG. 1. Firmware on DSP controller 108 controls the data collection at the various operating points in sequence while saving the data automatically at the end of each capture. This method eliminates the laborious data collection required by the related art locked-rotor tests. System 100 supports the measurement of the monitored parameters simultaneously, without delays in measurement time.

According to method 200, DSP controller 108 initializes 202 control parameters for motor 106. Thereafter, DSP controller 108 interacts with power converter 104 to start 204 the rotation of motor 106's rotor. Then, DSP controller 108 waits 206 for a period of time before determining 208 whether the rotor is rotating. Until DSP controller 108 determines 208 that the rotor is rotating, DSP controller 108 continues attempting to start 204 motor 106 and waiting 206 for a period of time before reassessing its determination 208.

Once the rotor is determined 208 to be rotating, DSP controller 108 sets 210 a test index value and establishes 212 test settings for the indexed test. Using the established test settings, motor 106's rotor speed is controlled 214 via DSP controller 108 and power converter 104 until the rotor speed is determined 216 to have reached a steady state condition.

When the rotor speed reaches a steady-state condition, DSP controller 108 sets 218 a test flag and collects 220 data regarding the voltage and current applied to motor 106 and the rotor's angular position with respect to the stator. Thereafter, DSP controller 108 stops 222 the rotor's rotation, downloads 224 the collected data to computer 112, and increments 226 its test index. If the incremented test index is determined 228 to be beyond the index value set for the last test measurement, then the testing is discontinued. Otherwise, the motor is restarted 204 and another measurement of the motor's operational parameters is made at the newly indexed operating point, as indicated by operations 204-228. Note, however, that the test index set in operation 210 is that identified by the test index value incremented in operation 226.

Figure 3:
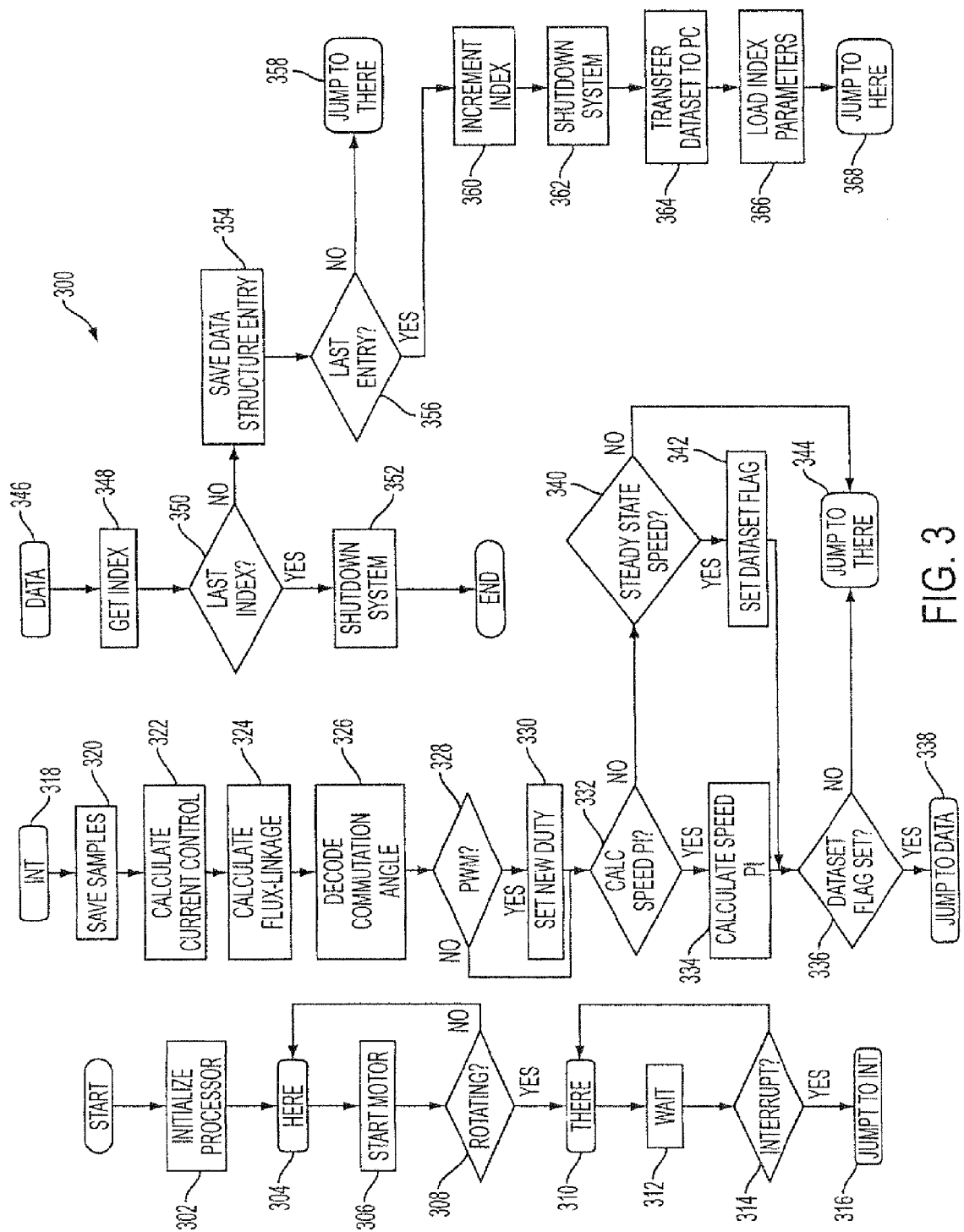
FIG. 3 illustrates a method for controlling and collecting data from the system illustrated in FIG. 1.

FIG. 3 illustrates a method 300 for controlling and collecting data from the system illustrated in FIG. 1. According to method 300, DSP controller 108 initializes 302 control parameters for motor 106. Thereafter, DSP controller 108 interacts with power converter 104 to start 306 the rotation of motor 106's rotor and, then, determines 308 whether the rotor is rotating. Until DSP controller 108 determines 308 that the rotor is rotating, DSP controller 108 continues attempting to start 306 the motor and reassessing its determination 308, via a program execution jump to program label HERE 304 made after every negative determination 308.

Once the rotor is determined 308 to be rotating, program execution proceeds to program label THERE 310 and DSP controller 108 waits 312 a period of time before determining 314 whether an interrupt condition has occurred. If the interrupt has not occurred, DSP controller 108 jumps program execution to program label THERE 310 and waits 312 a period of time before reassessing its determination 314 as to whether an interrupt has occurred. If the interrupt has occurred, DSP controller 108 performs a programming jump 316 to program label INT 318 to start an interrupt routine.

Once the interrupt jump 316 occurs, DSP controller 108 saves 320 data samples of the monitored motor parameters and calculates 322 a current control value and also calculates 324 a flux linkage value for the motor, based on the data samples of the monitored motor parameters. Then, DSP controller 108 determines 326 the commutation angle of the rotor by decoding the Hall-effect sensor signals. If DSP controller 108 determines 328 that pulse width modulation (PWM) is used to control the energization of motor 106's phase windings, then DSP controller 108 sets 330 the PWM duty cycle to achieve the desired rotor speed for the motor. Otherwise, program execution skips the PWM duty cycle setting operation 330 and proceeds directly to operation 332. After setting 330 the PWM duty cycle, DSP controller 108 determines 332 whether a speed calculation should be made. If so, DSP controller 108 makes 334 this calculation. Otherwise, DSP controller 108 determines 340 whether the motor rotor has reached a steady-state speed. If a steady-state speed has been achieved, DSP controller 108 sets 342 a Dataset flag. Otherwise, DSP controller 108 executes a jump 344 in its processing routine to execution label THERE 310, where DSP controller 108 waits 312 for an interrupt condition to be identified 314.

After the Dataset flag is set 342 or DSP controller 108 calculates 334 the rotor's speed, DSP controller 108 determines 336 whether the Dataset flag is set. If so, DSP controller 108 executes a jump 338 to execution label DATA 346. Otherwise, DSP controller 108 executes a jump 344 to execution label THERE 310.

Once the Dataset flag is set and program execution has jumped 338 to execution label DATA 346, DSP controller 108 obtains 348 the current index value and determines 350 whether this index value is the last one in the set. If so, DSP controller 108 shuts 352 down the system and ends the program execution. Otherwise, DSP controller 108 saves 354 a data structure containing the monitored and calculated operational parameters. Then, DSP controller 108 determines 356 whether the saved data structure is the last to be saved. If not, DSP controller 108 jumps 358 its processing to execution label THERE 310 where it waits 312 for an interrupt condition 314. Otherwise, DSP controller 108 increments 360 the index value, shuts down 362 the system operation, transfers 364 the saved data structures to computer 112, loads 366 index parameters, and jumps 368 its program execution to label HERE 304 so that motor 106 may be restarted.

Method 300 was applied to system 100 for collecting the operational parameters of a switched reluctance motor (SRM) having two phases, though it could have been applied to an SRM having any number of phases. In this application, the measurements of three parameters were collected by the system. These parameters were the current (i) provided to a phase winding by power converter 104, the flux-linkage ($\lambda$), and the discrete position ($\theta$) of motor 106's rotor.

The current (i) was collected via an amplified signal obtained from a simple resistor transducer 114. The inexpensive resistor transducer eliminated the need for an expensive current (i) sensor in the system.

The flux-linkage ($\lambda$) was estimated from the sampled current (i) using Faraday's law:

$$\lambda = \int (V_a - R_a i) dt$$

DSP controller 108 implemented the integration operation through numerical techniques, based on power converter 104's operational modes.

The winding voltage $V_a$ was determined from sampled converter parameters. The rotor position ($\theta$) was measured using two hall-effect sensors 110 whose signals provided quadrature angle encoding designating 0, 45, and 90 degrees. Due to the construction of the particular motor used in the test, this angle encoding was well suited for decoding commutation cycles to drive the motor.

Phase inductance was calculated using both the measured current and flux-linkage, in accordance with the expression $L = \lambda/i$. The monitored parameters were collected for each phase over an entire rotation of the rotor, though collecting these parameters from one phase was all that was required for controlling the motor's operation.

During each sample period the sampled parameters were stored and used to calculate other motor parameters such as flux-linkage ($\lambda$). The speed of the rotor was measured to determine the next point for data collection. If the data collection flag was set for a specific time, DSP controller 108 saved the sampled and calculated parameters into an array. Once all of the predetermined data points were collected, system 100 was shut down. Then, system 100 sent the collected data to computer 112, which stores and processes the collected data as well as establishes the test conditions for additional test points to be tested.

Table 1 provides a comparison of the collected parameters with those obtained through FEA simulations.

TABLE 1

| Rotor Position (degrees) | Measured Flux-linkages (V-s) | FEA Flux-linkages (V-s) | Error |
|---|---|---|---|
| 27 | 0.0389 | 0.0378 | 2.9% |
| 31 | 0.0448 | 0.0524 | 14.6% |
| 38 | 0.0650 | 0.0713 | 8.7% |
| 41 | 0.0722 | 0.0752 | 3.9% |
| 45 | 0.0789 | 0.0757 | 4.2% |

As may be determined from Table 1, the average flux linkage error between the data measured by system 100 using method 300 and the data obtained through the FEA simulation was about 7%. The FEA data itself had an expected simulation error of about 3%. Therefore, the data obtained using system 100 and method 300 are closely correlated with the FEA data.

Current (i) flux-linkage (λ), rotor angle (θ), and phase inductance (L) are important parameters for applying sensor-less control algorithms to a motor. Thus, the above-provided discussion elicits the significance of obtaining actual runtime measurements of these parameters. Obtaining runtime measurements of the operational parameters eliminates the need to employ expensive FEA design software for determining the data used in control design, as well as the manual labor involved in compiling the data at all the various operating points using locked-rotor tests. The above-described collection methods provide motor parameters, as the controller would experience them during runtime, for the purpose of developing sensor-less control systems more rapidly. If any noise or consistent, uncorrectable calculation error is present in the control signals, then a method can be devised to account for such variances and bring the sensor-less control back to the realm of high performance.

More specifically, a motor's rotor position can be estimated from the phase currents and flux-linkages of the windings, based on the three-dimensional relationships among these parameters. This fact may be used to model a sensor-less estimation technique with an Artificial Neural Network (ANN), since neural networks have an inherent capability for system identification.

Figure 4:
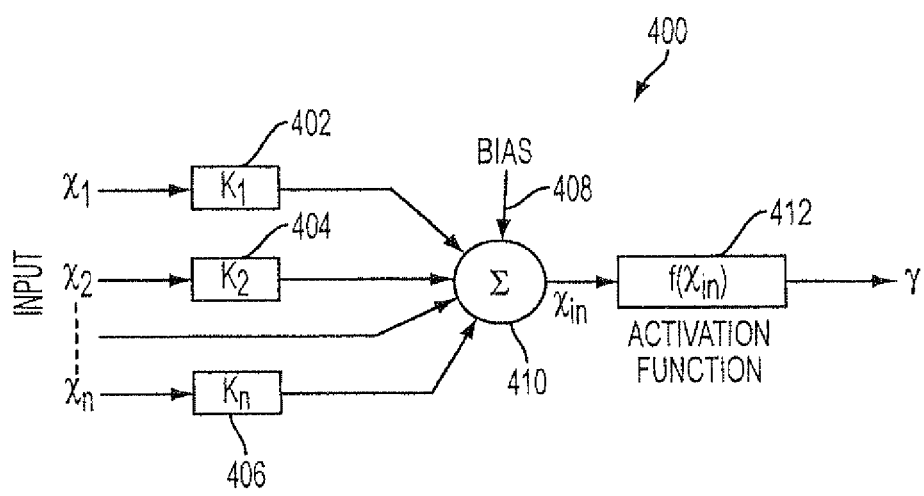
FIG. 4 illustrates a related art neuron.

FIG. 4 illustrates a related art neuron 400. A neural network consists of multiple neurons 400 in one or many layers with suitable inputs to neurons 400 and a bias/threshold 408 control. Each neuron 400 applies a set of gains, known as synaptic weights 402-406, to its input signals. Weights 402-406 are multiplied by the corresponding inputs $x_1$-$x_n$ and the products are summed with bias 408 in a summer 410 and then processed through an activation function 412.

Generally, the more nonlinear a system is, the more neurons that are required to model the system. In related art neural networks, the layers of neural nodes between the input and output nodes (i.e., hidden layers) induce the non-linear characteristics of the model. Consequently, the more non-linear a system is, the more hidden layers that are required to model the non-linearity of the system. Increasing the number of neurons and hidden layers increases the computation time required to generate outputs for the neural network.

In high-speed and inexpensive applications, such as blenders, the time required for a neural network to process a set of inputs so as to obtain the position of the rotor is far too great for practical applications. Inexpensive microcontrollers used for motor control applications cannot satisfactorily process the computations for a large ANN. And processors that are capable of processing the computations of large ANNs in a small amount of time are not feasible for low-cost applications. Therefore, the need for a better technique to infer rotor position from neural networks for high speed motor applications is required.

Figure 5:
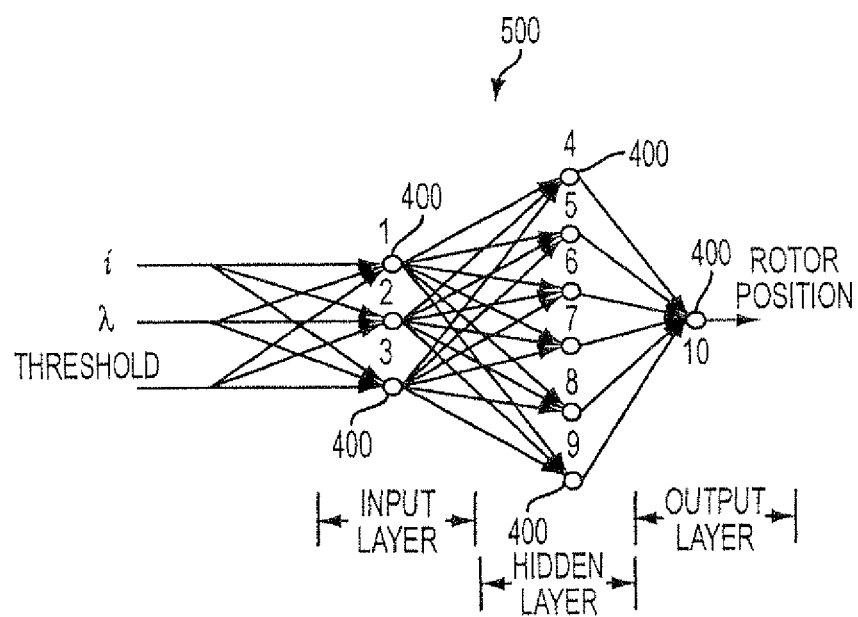
FIG. 5 illustrates a related art neural network that models a motor's magnetic characteristics using electrical signal inputs.

FIG. 5 illustrates a related art neural network 500 that models a motor's magnetic characteristics using electrical signal inputs, such as the motor's phase current (i) and flux-linkage (λ). Neural network 500 has ten neurons 400, of which three constitute an input layer, six constitute a hidden layer, and one constitutes an output layer. Only the six hidden layer and one output layer neurons employ a bias signal in neural network 500 and these bias signals are weighted in a manner similar to the weighting applied to the other neural inputs. Based on signals indicating a motor's phase current (i) and flux-linkage (λ), neural network 500 generates an estimate of the motor's rotor position.

Figure 6:
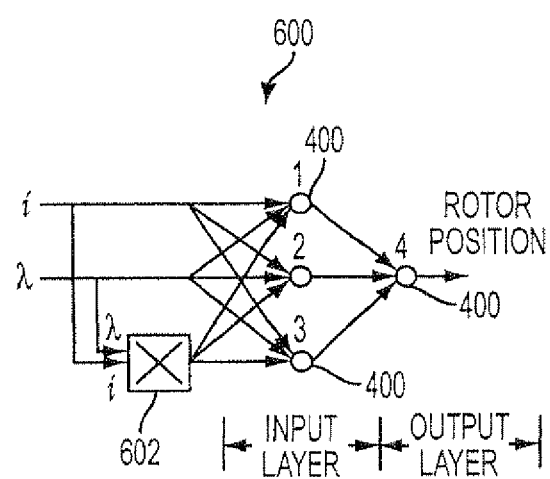
FIG. 6 illustrates a neural network of the present invention.

FIG. 6 illustrates a neural network embodiment 600 of the present invention. Similar to neural network 500, neural network 600 generates an estimate of a motor's rotor position based on signals indicating the motor's phase current (i) and flux-linkage (λ). However, neural network 600 models the motor's magnetic characteristics with nearly the same amount of accuracy as neural network 500 using only four neurons 400. Neural network 600 has three input layer neurons 400 and one output layer neuron 400. Both the input and output layer neurons 400 employ biasing in neural network 600 and the biasing signals are weighted in a manner similar to the weighting applied to the other input signals. Since neural network 600 has no hidden layers for generating the non-linearities needed to closely model the motor's magnetic characteristics, a non-linearity is introduced to the input layer neurons 400 by a multiplier 602. Multiplier 602 multiplies the motor's phase current (i) and phase-linkage (λ) signals together to produce a non-linear component representing the motor's magnetic characteristics and introduces this non-linear product as an input to each neuron 400 of neural network 600's input layer.

While both neural networks 500 and 600 are similarly capable of accurately estimating a motor's rotor position without the use of position sensors, neural network 600 does so with much fewer neurons 400 and computations. This is achieved by providing the additional preprocessed non-linear input to ANN 600. The non-linear input is a suitable combination of the primary inputs, such as phase current and flux-linkage, and provides the necessary dimension required to model the non-linear behavior of the motor.

Table 2 compares the performance characteristics of neural networks 500 and 600 for estimating the rotor position of a motor. In the comparative test conducted with the two networks, a back-propagation algorithm was used to train the networks to produce estimates of a motor's rotor position based on the motor's phase current (i) and flux-linkage (λ). Neural network 500 was trained to an average root-mean-square (rms) error of $5 \times 10^{-5}$ in 40,000 epochs and neural network 600 was trained to an rms error of $8.5 \times 10^{-5}$ in relation to the results obtained through locked-rotor tests.

TABLE 2

| Operational Characteristic | Neural network 500 | Neural Network 600 |
|---|---|---|
| Multiplications | 40 | 17 |
| Summations | 30 | 12 |
| Activations | 10 | 4 |
| Total Operations | 80 | 33 |
| Computation Time | 31.5 μs | 13 μs |
| RMS Error | $5 \times 10^{-5}$ | $8.5 \times 10^{-5}$ |

As indicated in Table 2, neural network 600 performs 33 mathematical operations to calculate the motor's rotor angle to an accuracy nearly the same as that achieved by neural network 500 through 80 mathematical operations. Of greater importance perhaps, neural network 600 estimated the rotor angle with a similar degree of accuracy in less than half the time required by neural network 500.

Generally speaking, an ANN requires training to model the motor system relationships accurately. Training the ANN can be accomplished by various methods known in the related art. The motor data collection techniques discussed in connection with FIGS. 1-3 can be used to extract the parameters that are required to train the ANN. For example, voltages and currents from the motor windings or the drive circuit can be sensed and used to provide inputs to the ANN to obtain the rotor position. However, the techniques described above for modeling the characteristics of a motor using an ANN are not limited to a motor or to inferring rotor position, they can be applied to infer any information for a system using pre-processed inputs. Also, the data collection methods can be combined with the neural estimators to achieve a quasi-self learning sensor-less motor drive, as described below.

To generate motion for a motor rotor, torque must be applied to the rotor. The motor torque relationship is described by:

$$T = \frac{1}{2}\frac{dL}{d\theta}i^2$$

According to this relationship, the sign of the torque depends on the slope of the inductance with respect to the change in angle. If the slope is positive, then the torque is positive, and vice versa. Also, the magnitude of the torque is directly proportional to the squared value of the current flowing in the phase windings. From this relationship, several methods to control the torque generation in the motor using sensor-less methods can be developed. One such method relies on an estimation of rotor position (θ) to govern the torque generation, another method relies on an estimation of winding inductance (L). In either case, the basic premise for generating torque is to control current conduction in the windings with respect to the angular rotor region corresponding to positive torque generation.

The angular symmetry of a motor ensures that the positive torque region repeats every X→0 degrees and the negative torque region repeats every Y→X degrees, where X is Y/2 (e.g., X=45 and Y=90 for a two-phase switched reluctance motor). Thus, to produce forward motoring, current must be generated in the stator winding when the rotor angle is between X→0 degrees with respect to the approaching stator pole. Minimal current should conduct through the stator winding when the rotor angle is between Y→X degrees, so as to avoid producing negative torque during forward motoring that will slow or even stall the rotor.

Figure 7:
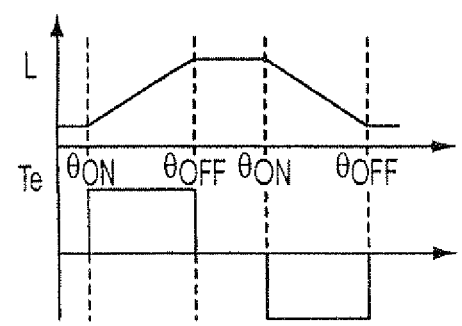
FIG. 7 illustrates the relationship between torque and phase winding inductance for a motor.

FIG. 7 illustrates the relationship between torque and phase winding inductance for a motor. As illustrated in FIG. 7, when current is applied to a phase winding as a rotor pole rotates from X→0 degrees with respect to an approaching stator pole associated with the phase winding, the inductance of the phase winding increases monotonically and positive torque is applied to the rotor. Conversely, when current is applied to the phase winding as the rotor pole rotates from Y→X degrees with respect to the stator pole associated with the phase winding, the inductance of the phase winding decreases monotonically and negative torque is applied to the rotor. The relationship between phase inductance (L), phase current (i), and torque may be used to control the operation of sensor-less motor.

The basic goal of a sensor-less controller is to estimate rotor position without using position sensors. The rotor position may be estimated from estimates of the phase inductance and flux-linkage, for both single-phase and multi-phase SRMs, and is used to regulate the application of current to the motor phases.

Figure 8:
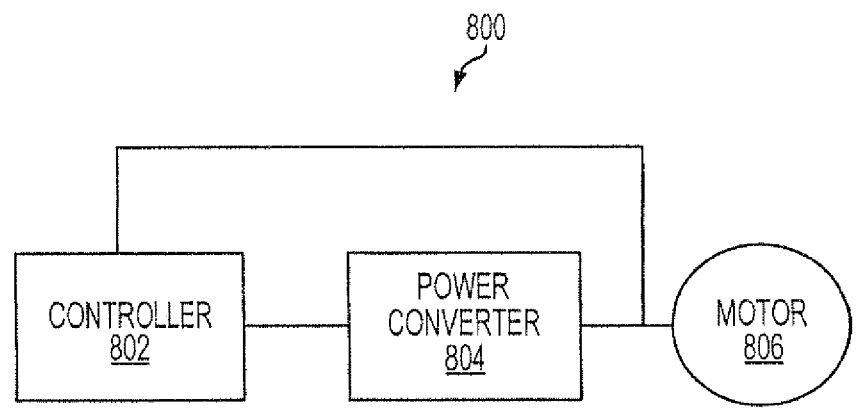
FIG. 8 illustrates a sensor-less control system of the present invention.

FIG. 8 illustrates a sensor-less control system 800 of the present invention. System 800 includes a controller 802, a power converter 804, and a motor 806, which may be a two-phase switched reluctance motor (TPSRM) for the purpose of this discussion. Controller 802 monitors voltage and current signals that are indicative of the voltage and current applied to a main phase winding of TPSRM 806. From these voltage and current signals, controller 802 estimates the flux-linkage. Applying the monitored current and estimated flux-linkage signals to neural network 600, which is implemented by controller 802, controller 802 may estimate the rotor position of motor 806. Based on the estimated rotor position, controller 802 regulates the PWM signal applied to power converter 804 so as to regulate the torque applied to the motor rotor.

Figure 9:
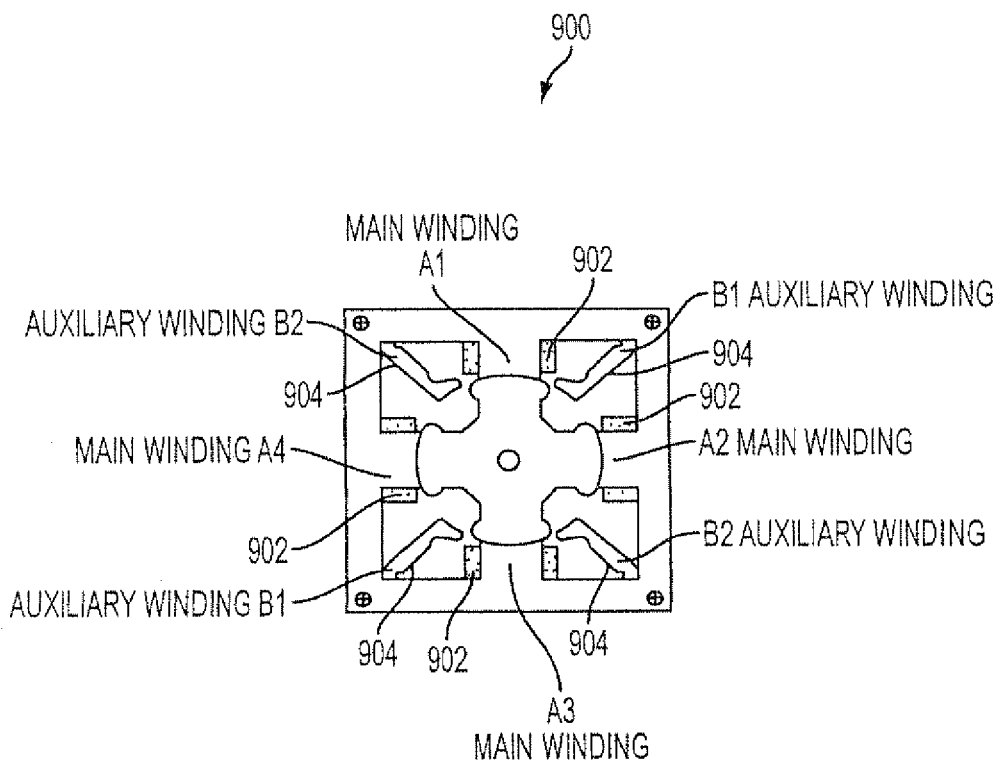
FIG. 9 illustrates a two-phase SRM of the present invention.

FIG. 9 illustrates a two-phase SRM 900 of the present invention. TPSRM 900 includes four main phase windings 902 and four auxiliary phase windings 904. The stator poles bearing auxiliary phase windings 904 are shifted 45 degrees with respect to the stator poles bearing main phase windings 902. Although TPSRM 900 is a two-phase machine, main phase windings 902 contribute nearly all of the torque produced in the machine. Auxiliary phase windings 904 are used to start the rotation of the machine's rotor and for recovering energy from main phase windings 902 when main phase windings 902 are not being energized.

Figure 10:
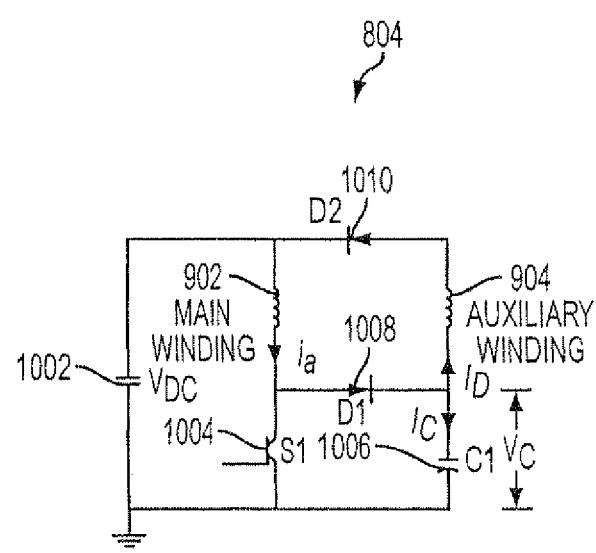
FIG. 10 illustrates a circuit topology of the power converter illustrated in FIG. 8.

FIG. 10 illustrates a circuit topology of power converter 804 illustrated in FIG. 8. A direct current (dc) source 1002 provides a voltage $V_{dc}$ across main phase windings 902 to energize these windings when a switch 1004 is activated by a PWM signal from controller 802. When the current in main phase windings 902 is to be commutated, switch 1004 is turned off and the energy stored in main phase windings 902 is partially transferred to the rotor as mechanical energy and partially transferred to auxiliary phase windings 904 and capacitor 1006 through diode 1008. When main phase windings 902 are re-energized, the energy stored in auxiliary phase windings 904 is partially returned to capacitor 1006. Diode 1010 is optional in power converter 804.

An equation that controller 802 may use for estimating the motor flux-linkage from the monitored current and voltage signals is derived as follows. First, two sets of equations modeling the behavior of TPSRM 806 and power converter 804 are derived, one for the conduction period and the other for the non-conduction period of switch 1004. The devices in power converter 804 are assumed to be ideal and, therefore, the voltage drops across the devices and switching transients of the devices and their induced effects are neglected. The differential equations expressing the operation of the machine, when switch 1004 is turned off, are provided below:

$$\frac{d\lambda_e}{dt} = -R_a i_a + (V_{dc} - V_c)$$

$$\frac{d\lambda_b}{dt} = -R_b i_b - (V_{dc} - V_c)$$

-continued $$\frac{dV_c}{dt} = \frac{(i_a - i_b)}{C}$$

$$i_a + i_b + i_c = 0$$

$$J\frac{d\omega_m}{dt} + B\omega_m = T_e - T_l,$$

where J is the inertia of the rotor (Kg-m$^2$); B is the load constant; $\lambda_a$ and $\lambda_b$ are the flux-linkages (V-s) of the main and auxiliary windings, respectively; $i_a$, $i_b$, and $i_c$ are the currents through main phase windings 902, auxiliary phase windings 904, and capacitor 1006, respectively; C is the capacitance of capacitor 1006; and $T_e$ and $T_1$ are the electromagnetic torque (N-m) and load torque, respectively.

Equations describing the motor when switch 1004 is turned on are:

$$\frac{d\lambda_a}{dt} = V_{dc} - R_a i_a$$

$$\frac{d\lambda_b}{dt} = V_c - V_{dc} - R_b i_b$$

$$\frac{dV_c}{dt} = \frac{i_c}{C} = \frac{i_b}{C}, \text{ where } i_b \geq 0$$

$$i_a + i_b + i_c = 0$$

$$J\frac{d\omega}{dt} + B\omega_m = T_e - T_j$$

The machine magnetic characteristics applied by controller 802 in the determination of the motor flux-linkage may be obtained from a finite element analysis (FEA) tool or by the data collection techniques described previously. For the purpose of deriving the flux-linkage equation below, the switching frequency of power converter 804 may be assumed to be 20 kHz, which determines the required sampling interval, and the control algorithm may be assumed to be executed only once per switching cycle. Since the flux linkages have a much larger time constant than the sampling period, the average flux-linkage may be derived as:

$$\lambda_{avg} = \lambda_{avg.t_{on}} + \lambda_{avg.t_{off}}$$

$$\lambda_{avg.t_{on}} = \int [dV_{dc} - dR_a I] dt$$

$$\lambda_{avg.t_{off}} = \int [(1-d)dV_c - (1-d)V_c(1-d)R_c I] dt,$$

where d is the duty cycle, $V_{do}$ is the source voltage, $R_a$ and $R_b$ the resistances of the main and auxiliary windings, respectively, I is the sampled current, $V_c$ is the voltage across the capacitor, and dt is the sample period. Thus, the average flux-linkage $\lambda_{avg}$ per sample period can be expressed, by summing the equations for $\lambda_{avg.ton}$ and $\lambda_{avg.toff}$, as:

$$\lambda_{avg} = \int [V_{dc} - (1-d)V_c - R_a I] dt,$$

in light of the fact that output variables such as rotor position and speed hardly change within a switching period.

Figure 11:
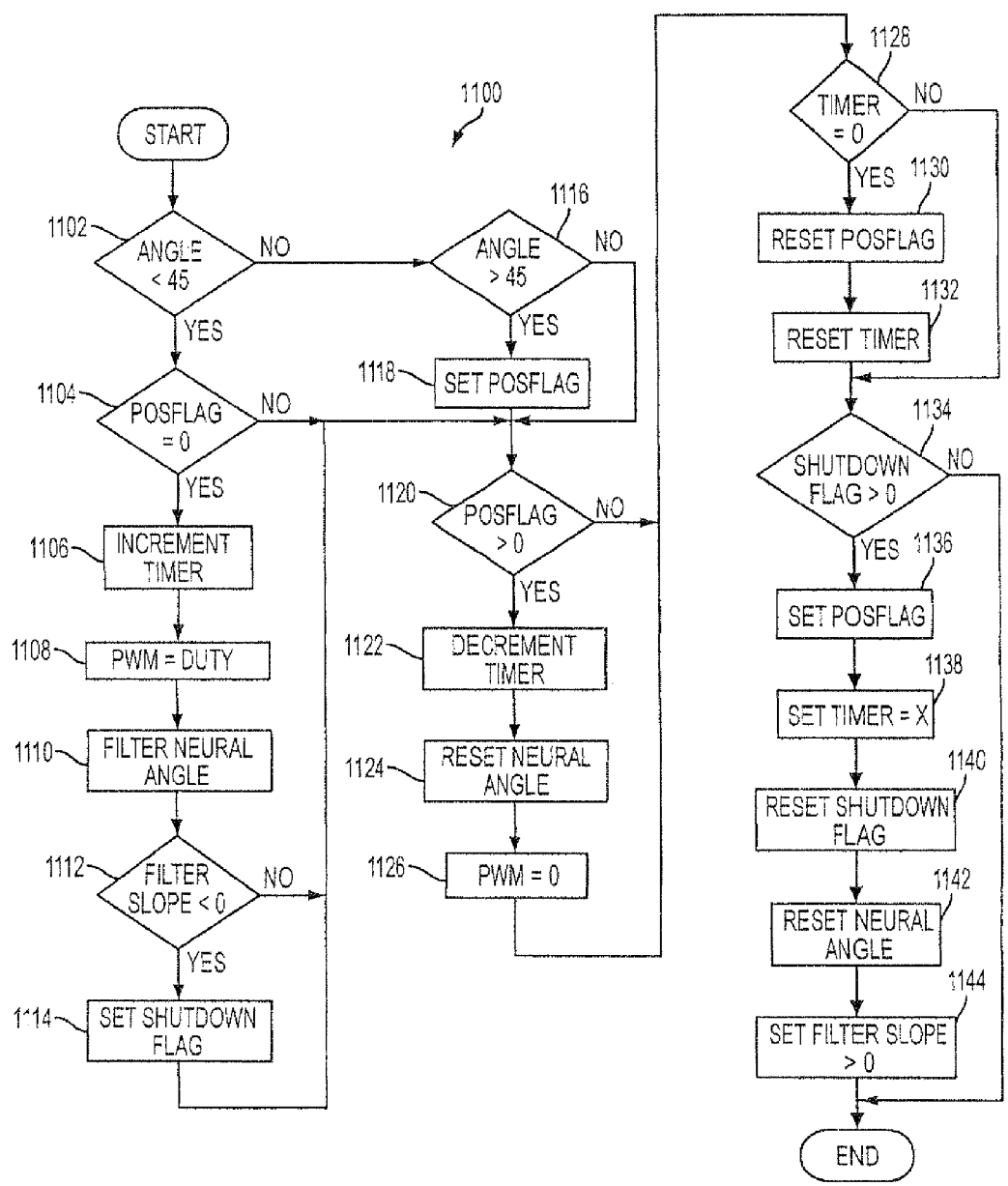
FIG. 11 illustrates a sensor-less motor control algorithm for rotor angle estimation.

FIG. 11 illustrates a sensor-less motor control algorithm 1100 for rotor angle estimation. This algorithm was experimentally applied to system 800 using controller 802 to control the on and off switching of switch 1004 within power converter 804 and thereby drive TPSRM 806. Controller 802 implemented neural network 600 so as to estimate TPSRM 806's rotor position.

Based upon the rotor position estimated by neural network 600, controller 802 commutated the phase current applied to main phase winding 902, by activating and deactivating the PWM controlling the phase current, to regulate the torque applied to the rotor. Power converter 804 was used to energize the SRM phase windings using the single switch 1004 for actively conducting current through main phase winding 902. The energy stored in main phase winding 902 by its energization was passively degenerated through auxiliary phase winding 904 during the PWM off state. Thus, the commutation of the current occurred as if the system was a single-phase motor drive.

Although algorithm 1100 is designed to control a single phase motor drive, multiple instances of this algorithm may used in conjunction with multiple PWM drives to adapt the commutation scheme for multi-phase systems.

Referring now to FIG. 11, algorithm 1100 uses the rotor position obtained from ANN 600 to determine whether main phase winding 902 should be conducting current or not. To make this determination, a comparison is made as to whether the rotor is in the conduction angle region with respect to the stator pole. That is, controller 802 determines 1102 whether the rotor poles are within 45 degrees of the stator poles they are approaching. If not, energizing main phase winding 902 will not produce positive torque for the rotor. The algorithm controls conduction by using a flag. This flag is set and reset based on the determination of the rotor angle provided by ANN 600. If the rotor poles are determined 1102 to be within 45 degrees (i.e., the commutation angle) of the upcoming stator poles, then a determination 1104 of a Posflag's value is made. If the rotor poles are determined 1116 to be greater than 45 degrees with respect to the upcoming stator poles, then Posflag is set 1118 to 1. If the rotor poles are determined 1116 to be at an angle of 45 degrees with respect to the upcoming stator poles, then the Posflag is left unchanged. After determining the angle of the rotor poles with respect to the upcoming stator poles, controller 802 determines 1104, 1120 the value of the Posflag. If the rotor-to-stator pole angle is less than the commutation angle (i.e., less than 45 degrees) and the Posflag value is 0, controller 802 will increment 1106 a timer and update 1108 the PWM duty cycle. The timer is used to determine the length of time main phase winding 902 will conduct current.

A secondary operation is performed to determine whether main phase winding 902 is conducting in the negative torque region. Controller 802 digitally filters 1110 the rotor position information generated by ANN 600 and then determines 1112 whether the slope of the filtered signal is decreasing. If the angle appears to be decreasing, then a Shutdown flag is set 1114.

If: (1) the rotor-stator pole alignment is determined 1102 to be less than 45 degrees and the Posflag is not equal to 0; (2) the rotor-stator pole alignment is determined 1116 to be 45 degrees; (3) the Posflag is set 1118 to 1; (4) the slope of the filtered rotor position signal is determined to be positive; or (5) the Shutdown Flag is set 1114 to 1, then a determination 1120 is made whether the Posflag has a value greater than 0. If so, then the timer is decremented 1122, the neural angle is reset 1124, the PWM signal is set 1126 to a value of 0, and a determination 1128 is made whether the timer value equals 0. Otherwise, the determination 1128 of the timer value is directly made without performing the intervening operations 1122-1126.

If the timer is determined 1128 to have a value of 0, then the Posflag is reset 1130 to a value of 0, the timer is reset 1132 to a value of 0, and a determination 1134 is made whether the Shutdown Flag has a value greater than 0. If the timer is determined 1128 to have a value different from 0, then the determination 1134 is made whether the Shutdown Flag has a value greater than 0 without performing the intervening operations 1130 and 1132.

If the Shutdown Flag is determined 1134 not to have a value greater than 0, then the algorithm is ended. Otherwise, the Posflag is set 1136 to a value of 1, the timer is set 1138 to a value of X, the Shutdown Flag is reset 1140, the neural angle is reset 1142, the slope of the filtered angle signal is set 1144 positive, and the algorithm is ended.

More generally, the sensor-less control algorithm illustrated in FIG. 11 uses the rotor position obtained from ANN 600 for estimating the motor's rotor position so as to determine whether the motor's phase winding should be conducting current or not. First a comparison is made as to whether the rotor is in the conduction angle region with respect to the stator pole. Positive torque can only be generated in the motor when its rotor is in the conduction angle region.

Algorithm 1100 controls conduction by using a flag. This flag is set and reset based on the determination of the rotor's angle. If ANN 600 estimates that the rotor position (θ) is less than the commutation angle, then the flag is reset. If the commutation angle has been reached, then the algorithm will set the flag. While the angle is less than the commutation angle and the flag is not set, algorithm 1100 will increment a timer and update the PWM duty cycle. The timer is used to determine the length of time the phase has been conducting.

A secondary operation is performed to determine whether the phase is conducting in the negative torque region. First, controller 802 digitally, filters the output of ANN 600 and then determines whether the slope of the filtered output is decreasing. If the angle appears to be decreasing then a shutdown flag is set.

Once the commutation angle is achieved, the position flag is set. The timer and duty cycle are no longer updated. Controller 802 will set the PWM duty cycle to zero and start decrementing the timer. The basis of the control is to equalize the time that the phase conducts with the time that it does not conduct. Thus, to produce positive torque, the phase is energized and a timer is incremented until the commutation angle is achieved. Thereafter, the negative torque region will be bypassed by withholding energization of the main phase winding for the same amount of time. The algorithm, as explained, works well if the motor has reached a constant speed, i.e., the amount of time for positive torque region conduction equals that needed to bypass the negative torque region.

To achieve highly satisfactory operation when the motor speed is changing, a secondary operation is performed to determine whether the rotor angle is in the positive or negative torque region. Depending on the training of ANN 600, the estimation of the angle in the negative torque region should vary greatly from the estimation while in the positive torque region. An appropriate IIR filter may accomplish the signal processing required for the decision making task of shutdown.

Shutdown is used to correct for commutation error if the machine speed is not constant. The shutdown mechanism may be controlled via a shutdown flag. If the flag is set, algorithm 1100 will enter a special state wherein the PWM is turned off, sets the position flag for countdown, and adjusts the countdown timer to a special value. The special countdown value is much less than a normal conduction period timer value.

Figure 12:
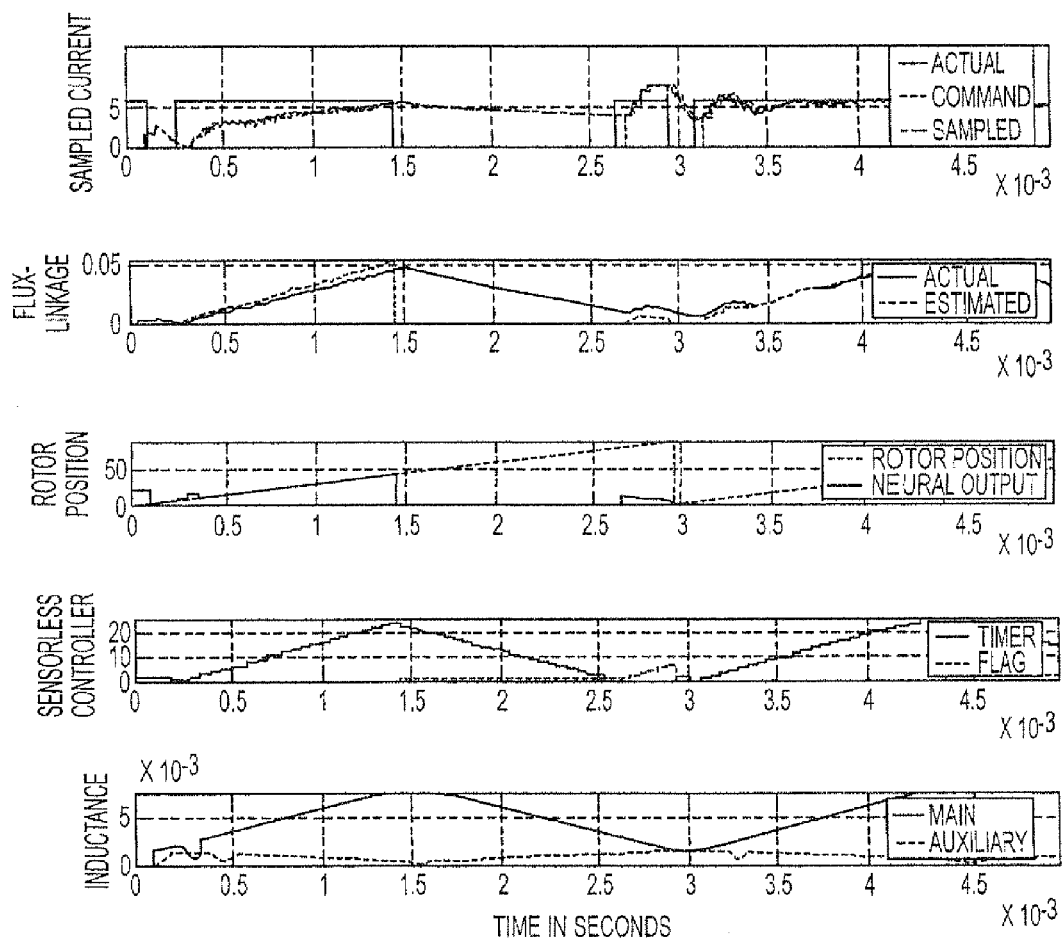
FIG. 12 illustrates the results achieved by simulating the application of the algorithm illustrated in FIG. 11 to the sensor-less control system illustrated in FIG. 8.

FIG. 12 illustrates the results achieved by simulating the application of algorithm 1100, illustrated in FIG. 11, to the sensor-less control system 800 illustrated in FIG. 8. Referring to FIG. 12, current conduction through the motor's main winding 902 starts just prior to entering the positive torque region and algorithm 1100 senses this condition and shuts the PWM off. The start of the positive torque region is denoted by rotor position 0 (zero). The current conduction produces a short, but significant, current pulse in the negative torque region having a duration that is directly proportional to the shutdown timer value used in the secondary operation, described above.

Whether setting the countdown normally due to the commutation angle being reached or whether in the special shutdown mode, the algorithm operation is the same. A value is placed in the countdown timer and the PWM is shut off. Algorithm 1100 then proceeds to decrement the timer. Once algorithm 1100 has completed its countdown, all the flags and controlling variables are reset, algorithm 1100 will begin to count up, and the whole process repeats.

Figure 13:
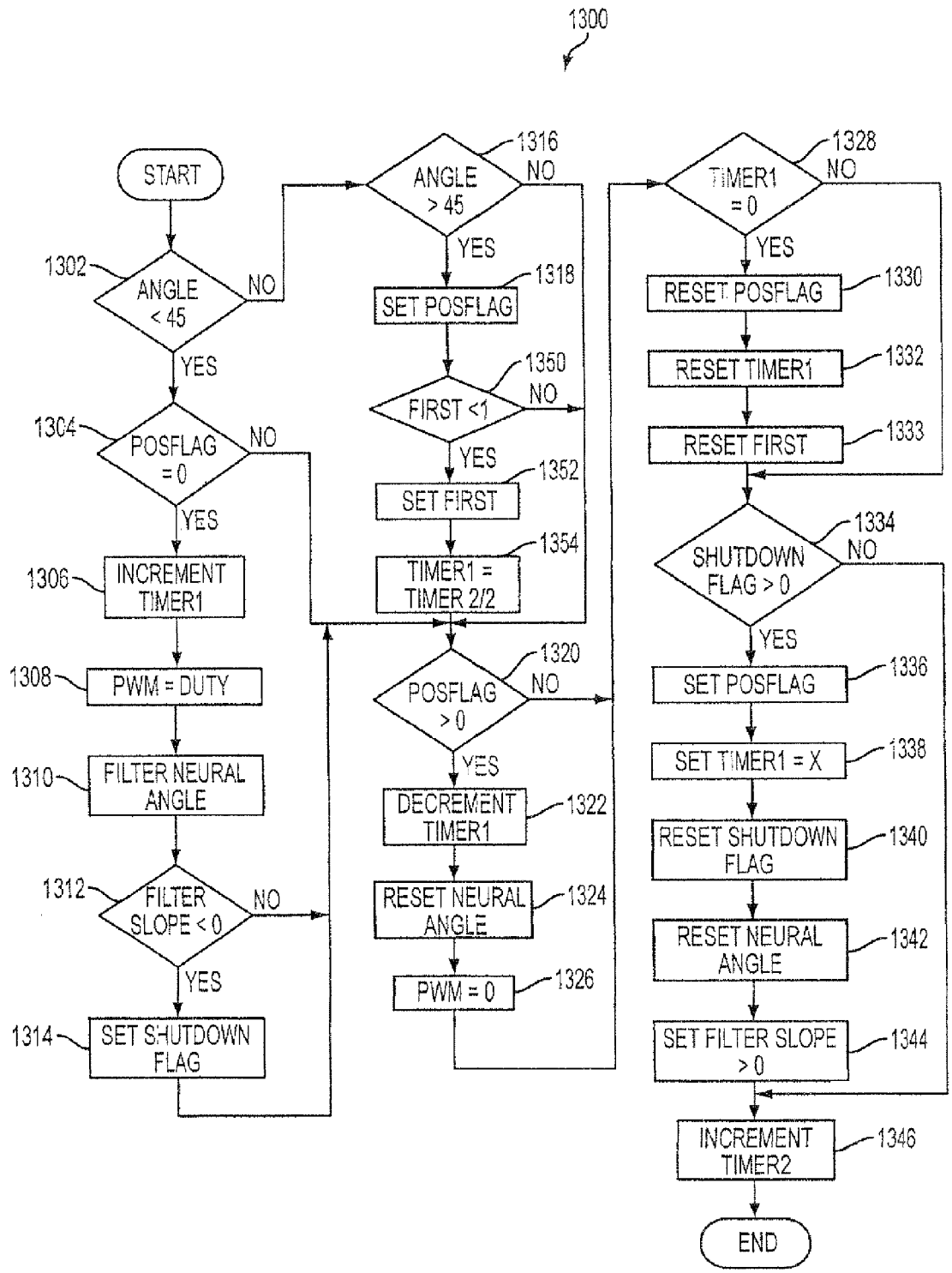
FIG. 13 illustrates another sensor-less motor control algorithm for rotor angle estimation.

FIG. 13 illustrates another sensor-less motor control algorithm 1300 for rotor angle estimation. Algorithm 1300 and 1100 similarly adjust a timer to bypass a motor's negative torque region. However, the basic premise of algorithm 1300 is to estimate the speed of the machine and adjust the timer just prior to countdown and PWM turn off. If the machine is speeding up, the timer will reflect this and algorithm 1300 should adjust the bypass countdown such that the time required to bypass is less. If the machine is slowing down, just the opposite should happen, algorithm 1300 should adjust the timer up to increase the amount of time required to bypass the negative torque generation region.

The time adjustment for the bypass region is accomplished by adding a second timer that counts the duration between resets of the position flag. The timer value at PWM shut off due to the commutation angle being reached is exactly twice what the bypass duration should be, thus the countdown can be set, at the commutation time, to have a value equal to half the value of the second timer. More simply stated, the bypass duration is set equal to half the amount of time controller 802 estimates for the combined durations of the conduction and non-conduction phases of operation.

Algorithm 1300 operates as follows. Controller 802 determines 1302 whether the angle estimated by ANN 600 is less than 45 degrees. ANN 600 produces an angle estimate of between 0-90 degrees. Rotor angle estimates of between 90 and 45 degrees indicate the region where the rotor pole has passed or is leaving the stator pole it was aligned with previously. A 45-degree estimate corresponds to the point where the rotor is equally far from its adjacent stator poles. The region indicated by an estimate of 45-0 degrees is where the rotor pole is closer to the stator pole it is approaching for a specified direction of rotation.

Accordingly, if ANN 600 estimates an angle that is less than 45 degrees, the motor is operating in the conduction region, that is, switch 1004 is to be turned on. If the rotor position obtained from ANN 600 is greater than 45 degrees, switch 1004 has to be turned off, if it is on, or has to remain off.

Controller 802 determines 1304 whether the position flag, Posflag, has a value of 0. This flag determines whether the motor is in the conduction (positive torque) region or not. If the position flag, Posflag, has a value of 0, a timer, Timer1, is incremented 1306, If the position flag is not 0, algorithm 1300 proceeds to operation 1320, discussed later. Timer1 counts the conduction time during a conduction interval.

After Timer1 is incremented 1306, controller 802 calculates and sets 1308 the PWM duty cycle. Then, controller 802 obtains and filters 1310 an angle estimate provided by ANN 600. Based on the filtered angle estimate, controller 802 determines 1312 whether the angle estimated by ANN 600 is increasing or decreasing with respect to the previous angle that was obtained and filtered. If the filtered slope of the angle estimates is negative, the rotor is moving in the specified direction of rotation and approaching the next stator pole in the direction of rotation. If this slope is positive, the rotor pole is moving away from the stator pole it is supposed to approach in the direction of rotation. In other words, a positive slope means that ANN 600 is estimating increasing angles (opposite to the intended direction of rotation), instead of decreasing angles.

If controller 802 determines 1312 that the slope is less than 0 (decreasing angles), controller 802 sets 1314 the shutdown flag. If controller 802 determines 1312 that the slope is greater than 0, controller 802 proceeds to operation 1320.

At operation 1320, controller 802 determines 1320 whether Posflag has a value greater than 0. If so, which means its value is 1, Timer1 is decremented 1322 (counting down Timer1, non-conduction period), the estimated angle provided by ANN 600 is reset or zeroed 1324, the PWM is turned off 1326, and program execution proceeds to operation 1328. In operation 1326, PWM=0 indicates that the PWM is turned off, which results in switch 1004 being turned off. Timer1 is incremented during conduction and decremented during non-conduction of switch 1004. If Posflag is determined 1320 not to have a value greater than 0, then program execution proceeds to operation 1328 without performing the intervening operations 1322-1326.

In operation 1328, controller 802 determines 1328 whether the value of Timer1 is 0. If Timer1's value is zero, controller 802 resets 1330 the value of Posflag, which makes its value 0, and resets Timer1 1332 and a flag called First 1333. Timer1 would be equal to zero if Timer1 had been decremented to 0 (finished the conduction interval) or if operation 1354 set Timer1 to be 0, when algorithm 1300 is called for the first time. The First flag indicates the first time sensor-less algorithm 1300 is called by controller 802, that is, when the motor is turned on. Accordingly, resetting 1333 the value of First will only occur the first time algorithm 1300 is called.

Before proceeding further (to operation 1334), consider the circumstance where controller 802 determines 1302 that the estimated rotor angle is not less than 45 degrees. Controller 802 determines 1316 whether the angle estimated by ANN 600 is greater than 45 degrees. If not, controller 802 determines that the motor has just been turned on or there is no voltage across, or current in, the windings and no angular position has been estimated by ANN 600. However, if the rotor angle is estimated 1316 to be greater that 45 degrees, controller 802 sets 1318 the value of Posflag to 1, so the PWM remains off in the next cycle. Then, controller 802 determines 1350 whether the value of the First flag is less than 1. If so, which means its value is 0, controller 802 sets 1352 the value of FIRST to 1. Then, controller 802 sets 1354 the value of Timer1 to be equal to half the value of Timer2, which calculates the total time for conduction (positive torque region) and non-conduction (switch 1004 is off to bypass the negative-torque region). Therefore, controller 802 sets 1354 Timer1 to be half of Timer2 under the premise that the conduction interval is equal to the non-conduction interval. Thereafter, controller 802 proceeds to operation 1320, which is described above. If the estimated rotor angle was not determined 1316 to be greater than 45 degrees or the value of First flag was not determined 1350 to be less than 1, then the value of Timer1 is set 1354 to half the value of Timer2 without performing the intervening operations 1318 and 1350-1352 or 1352, respectively.

Returning now to operation 1334, if controller 802 determines 1328 that the value of TIMER1 is not 0 or if controller has reset 1333 the value of First flag 1334, then controller 802 determines 1334 whether the Shutdown flag was set in operation 1314. If so, then controller 802 determined that the estimated angles provided by ANN 600 were decreasing. Therefore, if the angles are decreasing, then position flag Posflag is set 1336 to a value of 1 and Timer1 is set 1338 to a time determined by controller 802. Also, controller 802 resets 1340 the Shutdown Flag to a value of 0, the estimated angle provided by ANN 600 is cleared 1342, and controller 802 sets 1344 the filter slope to a positive value in 1334. Then, controller 802 increments 1346 the value of Timer2. If controller 802 determines 1334 that the Shutdown flag is not greater than 0, then Timer2 is incremented 1346 without performing the intervening operations 1336-1344.

Algorithm 1300 is set to run every 50 microseconds by controller 802. Before algorithm 1300 is called for the first time, all the timers and flags are cleared or set to 0. As the motor runs, algorithm 1300 will determine the conduction intervals based on the position estimated by ANN 600 every 50 microseconds.

Figure 14:
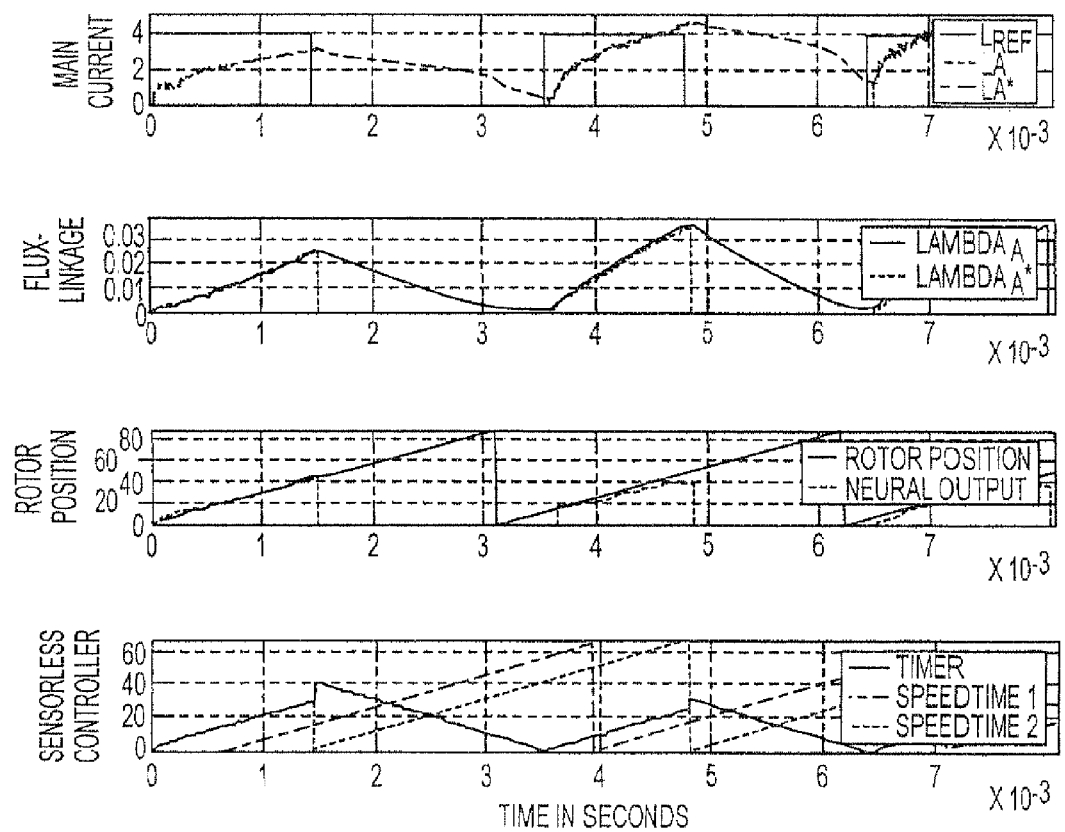
FIG. 14 illustrates the results achieved by simulating the application of the algorithm illustrated in FIG. 13 to the sensor-less control system illustrated in FIG. 8.

FIG. 14 illustrates the results achieved by simulating the application of algorithm 1300, illustrated in FIG. 13, to the sensor-less control system 800 illustrated in FIG. 8. Referring to FIG. 14, the simulation shows that the initial non-conduction period is too long. The countdown period was artificially adjusted to demonstrate the position error correcting capability of the algorithm. The PWM should initiate conduction almost 0.0005 seconds earlier in the second conduction period. To correct this error, the speed estimation is used to adjust the countdown timer. This timer's value is adjusted in consecutive conduction periods until the sensor-less conduction period matches the positive torque region. The flux-linkage estimation drives the neural network output for commutation angle derivation, as previously discussed. The speed estimation is used to correct error in the speed timers, which are used to determine the non-conduction duration.

As an alternative to commutating the current applied to the main winding 902 of motor 806 based on estimating the rotor-stator pole alignment with ANN 600, the commutation may be based on an estimate of the winding's inductance. This approach is similar to that described for commutating the current based on the estimation of rotor position, in that both approaches use a flag to determine the region of conduction in conjunction with a timer so as to determine the lengths of time to conduct or not. However, with the latter approach, the method for setting or resetting this flag and thus commutating the current is based on an inductance estimate and not an estimate of rotor position provided by an ANN.

There are two methods by which inductance can be estimated: a two-point current sampling method and a flux-linkage divided by current method. Both methods are described below.

The two-point current sampling method relies upon the assumption that the switching period is sufficiently fast that the inductance is relatively constant during the on-period of the switch. Based on this assumption, the slope of the current during this time is directly proportional to the inductance of the phase and the inductance of the phase winding is related to the motor's rotor angle. Thus, if the inductance is calculated, the angle of the rotor can be predicted.

Two points are sampled from the phase current measurements. The two sample points should be obtained during the same conduction period of the switch to get a proper measurement. The method is viable across many speeds and current levels if the system can tolerate steady-state error in the current control.

Low-performance drives for appliances are the intended application. Also, this method is subject to signal noise. If noise is present in the sampled signals, it is difficult to determine the actual inductance signal. Thus, methods to accurately measure the winding current may be appropriate.

The flux-linkage method involves estimating the flux and then calculating the inductance via the relationship:

$$L = \frac{\lambda}{i},$$

where $\lambda$ is the estimated flux linkage, i is the estimated current flowing through the main winding, and L is the inductance. From the relationship:

$$T = \frac{1}{2} \frac{dL}{d\theta} i^2,$$

where $\theta$ is the angle of rotor alignment with respect to the stator and T is the torque applied to the rotor, it may be determined that if the change in inductance is positive then the torque generation will also be positive. This principle is relied upon to accomplish a commutation scheme.

Accordingly, algorithms 1100 and 1300 could be modified to perform current commutation based on the above-described methods for estimating the inductance of the motor's winding, rather than estimating the motor's rotor position. As such, the estimated inductance would determine whether to set or reset the commutation flag in algorithms 1100 and 1300.

Figure 15:
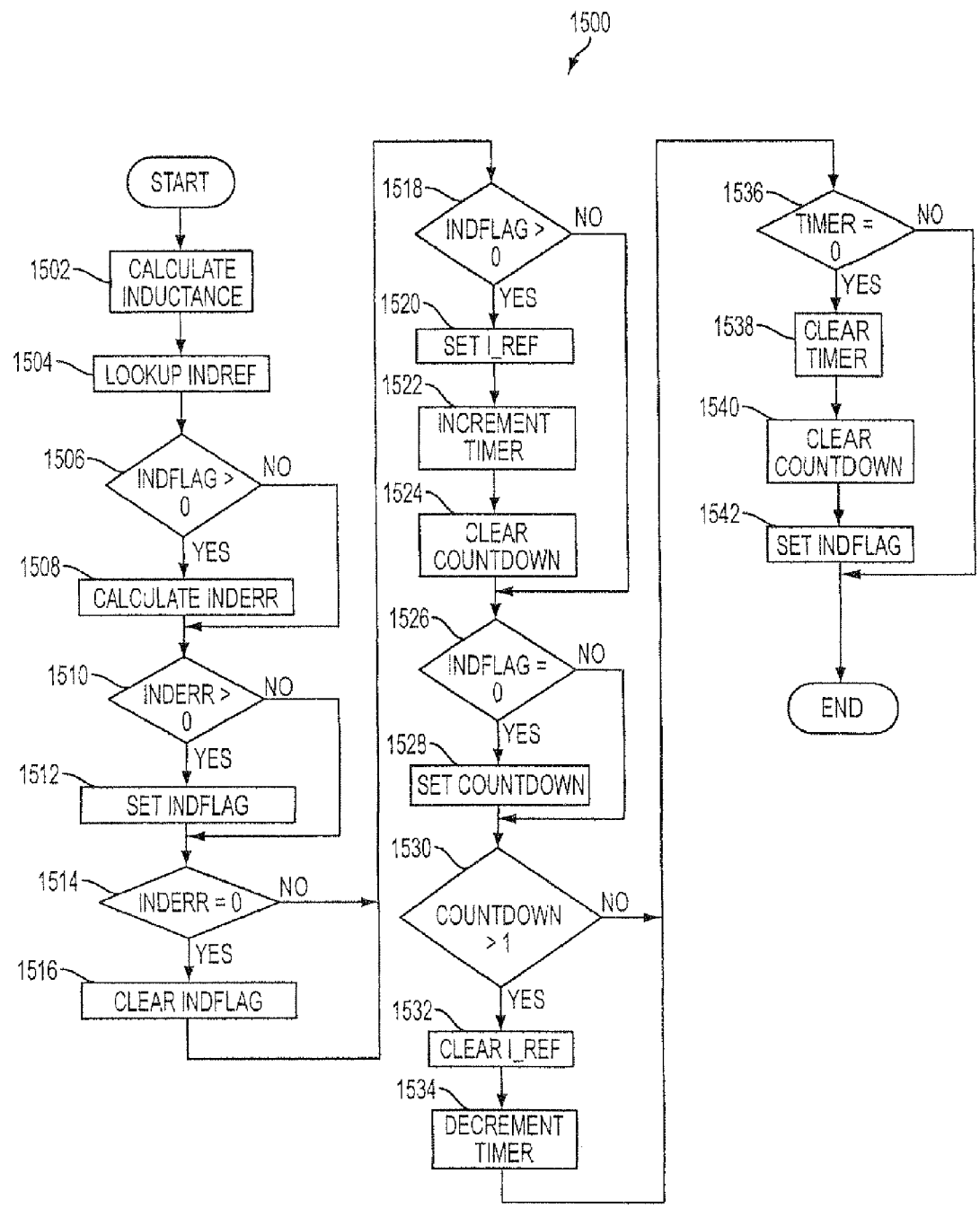
FIG. 15 illustrates a sensor-less commutation algorithm for commutating current applied to a motor winding based on estimates of the winding's inductance.

FIG. 15 illustrates a sensor-less commutation algorithm 1500 for commutating current applied to a motor winding based on estimates of the winding's inductance. The premise of control in algorithm 1500 is similar to that for algorithms 1100 and 1300. A flag controls the conduction region. A lookup table derived from FEA data is implemented and used to generate an inductance reference level. The first step is to select a reference level from the lookup table by which the estimated inductance is evaluated. The method of selection is based on a current reference level that can be either derived from the torque command or from the actual sensed current signal. When the estimated value exceeds the reference, the PWM signal should be terminated. Again a timer is used to determine the duration between the time that the PWM is shut off and when it should be reinitiated.

Since there is no inherent error correction in this method, if the inductance estimation is incorrect, the algorithm will produce incorrect commutation angles. This is due to the absolute scale values that are used for determining the time at which the PWM should be shut off. Other methods have to be used to correct for any inconsistencies in the estimation process.

Algorithm 1500 is implemented by controller 802 as follows. The inductance of the motor's main winding 902 is estimated 1502 based on estimates of the flux linkage and current flowing through main winding 902. Based on the current estimate or an estimate of the torque applied to the rotor, an inductance reference value is selected 1504 from a lookup table. If an Indflag is determined 1506 to be greater than 0, then an Inderr value is calculated 1508 and a determination 1510 is made whether the calculated Inderr value exceeds 0. Otherwise, the determination 1510 is made whether the Inderr value exceeds 0 without performing the intervening operation of calculating 1508 the Inderr value.

If the Inderr value is determined 1510 to be greater than 0, then an Indflag is set 1512 and a determination 1514 is made whether the value of Inderr is 0. Otherwise, the determination 1514 is made whether the value of Inderr is 0 without performing the intervening operation of setting 1512 Indflag.

If the value of Inderr is determined 1514 to be 0, then the value of Indflag is cleared 1516 and a determination 1518 is made whether the value of Indflag is greater than 0. Otherwise, the determination 1518 of whether Indflag is greater than 0 is made without performing the intervening operation of clearing 1516 the value of Indflag.

If the value of Indflag is determined 1518 to be greater than D, then the value of I_ref is set 1520, a timer value is incremented 1522, a countdown value is cleared 1524, and a determination 1526 is made whether the value of Indflag is 0. Otherwise, the determination 1526 is made whether the value of Indflag is 0 without performing the intervening operations 1520-1524.

If the value of Indflag is determined to be 0, then the value of Countdown is set 1528 and a determination 1530 is made whether the value of Countdown is greater than 1. Otherwise, the determination 1530 is made whether the value of Countdown is greater than 1 without performing the intervening operation of setting 1528 the Countdown.

If the value of Countdown is determined 1530 to be greater than 1, then the value of I_ref is cleared 1532, the Timer value is decremented 1534, and a determination 1536 is made whether the Timer value is 0. Otherwise, the determination 1536 is made whether the Timer value is 0 without performing the intervening operations 1532 and 1534.

If the Timer value is determined 1536 to be 0, then the Timer value is cleared 1538, the Countdown value is cleared 1540, the Indflag value is set 1542, and the algorithm is discontinued. Otherwise, the algorithm is discontinued without performing the intervening operations 1538-1542.

A method of adjusting the negative torque region using a timer that estimates the speed can be used for induction error correction in conjunction with algorithm 1500. The induction estimation error should be consistent enough that the commutation angles happen at the same angle, but not necessarily at the correct angle. Thus, a timer, used to measure the duration between commutation angles, can be used to adjust the position error. The value in the countdown timer of algorithm 1500 can be adjusted up or down to correct any error that occurs during the positive torque region conduction time.

A significant difference between algorithm 1500 and algorithm 1300 is that algorithm 1500 uses an indication of the phase winding's inductance to determine positive torque and negative torque regions of the motor, instead of the rotor position (or angle). Referring back to FIG. 7, it may be seen that the positive inductance slope region corresponds to the positive torque region and the negative inductance slope region corresponds to the negative torque region (or non-conduction interval). Where the inductance remains constant, no torque is generated even if main winding 902 is commutating. Therefore, if algorithm 1500 determines that the inductance is increasing 1510, it will commutate current through main winding 902 by turning on switch 1004. If a negative inductance slope is detected or a zero inductance slope is detected, controller 802 will stop commutating current through main winding 902.

Inductance flag, IndFlag, will be set (IndFlag=1) if a positive inductance slope is detected 1510. Operation 1518 determines whether IndFlag is 1 or 0. If the flag's value is greater than 0, then the rotor is in the conduction region and controller 802 will commute current through switch 1004.

I_ref is the current reference (or commanded current) determined by controller 802. Operation 1522 will increment the Timer and proceed. The Timer will count the conduction interval or the positive inductance slope interval.

If the inductance error from operation 1510 is less than 0, operation 1514 checks if the inductance error is equal to zero or not. If operation 1514 determines the error is not zero, program execution proceeds to operation 1518. If the inductance error is determined 1514 to be 0, then the inductance estimated is less equal to the inductance reference 1504. This means the inductance is constant at two different time intervals and, hence, the motor is operating in a zero torque region. This means that the rotor is completely aligned or unaligned with reference to the stator and the inductance flag is cleared or set to 0. This would result in algorithm 1500 proceeding to operation 1526 which sets the Countdown Flag (Countdown=1), which results in the controller 802 withholding conduction until the timer reaches 0. The Countdown flag will remain at a value of 1 until the Timer has decremented 1534 to 0, which occurs in operation 1536. Hence, operation 1532 clears I_ref, which will result in non-conduction and switch 1004 being turned off. The Timer decrementing to 0 indicates the negative torque region or zero torque region and the negative torque interval lasting as long as the positive torque interval.

If the inductance error 1508 has a value less than 0, the IndFlag will remain at a value of 0 as it was set when algorithm 1500 ran for the first time or by operation 1540. If the inductance flag has a value of 0, then the current reference I_ref will remain at a value of 0 and switch 1004 will remain off. If the Timer is decremented to 0, it is cleared/reset, the Countdown Flag is cleared/reset, and the inductance flag is set to 1 for the next cycle, which will result in algorithm 1500 checking for the positive inductance slope region again. If the Timer does not have a value of 0, algorithm 1500 ends and waits till the next time it is called.

Figure 16:
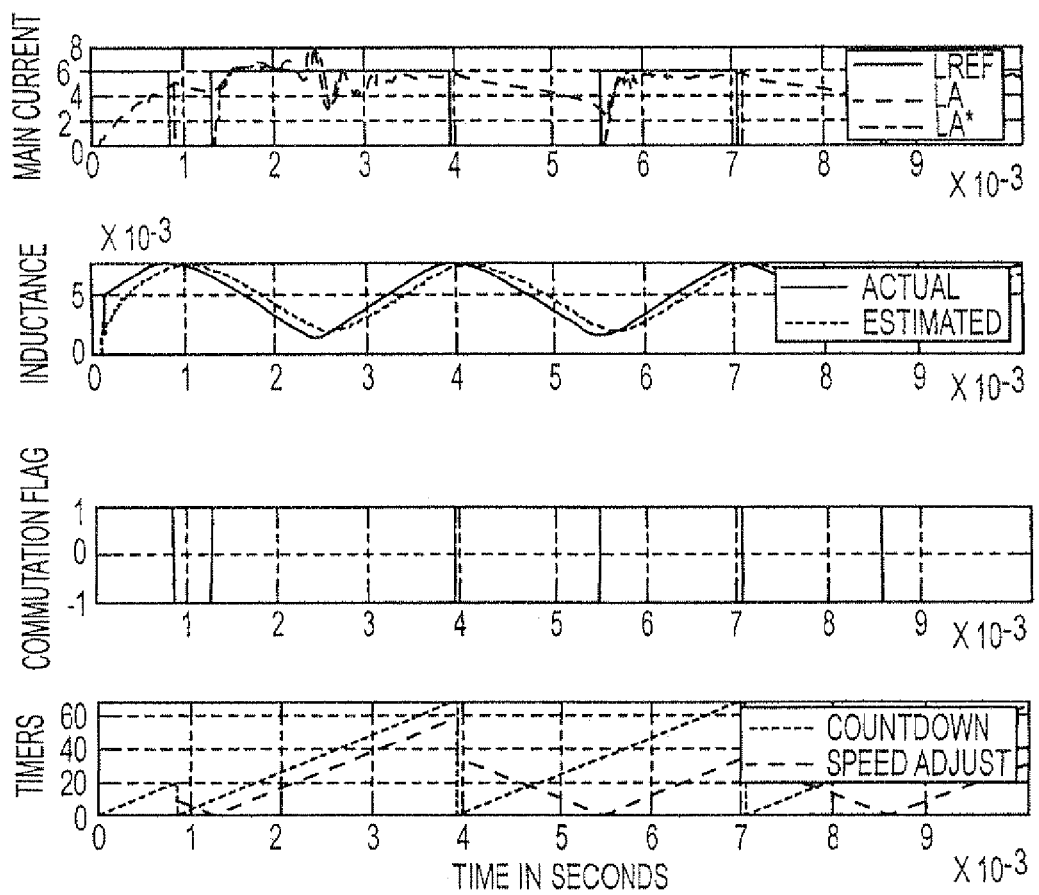
FIG. 16 illustrates the results achieved by simulating the application of the algorithm illustrated in FIG. 15 to the sensor-less control system illustrated in FIG. 8.

FIG. 16 illustrates the results achieved by simulating the application of algorithm 1500, illustrated in FIG. 15, to the sensor-less control system 800 illustrated in FIG. 8. In the simulation, the rotor's start angle was intentionally set so as not to coincide with the beginning of the conduction angle region. The start angle was set 20 degrees into the region, thus introducing significant error in the system. As may be determined from inspection of FIG. 16, the inductance reference algorithm gives a very good indication of the commutation angle coupling the good inductance reference with an adjustment to the countdown timer, based on the measured time between commutation angles, an excellent correction of the induction error may be achieved.

Another sensor-less commutation control method employs an inductance slope method. This method calculates the inductance slope from a filtered, estimated value. When the slope of the filtered variable is near zero or negative, then a flag will be set to shutdown the PWM. All rules still apply with the use of timers to determine length of conduction/non-conduction periods. This method inherently has some error correction for commutation without any speed adjustment. Since an absolute scale is not used, the algorithm can correct position errors in the presence of estimation errors by using the general shape of the inductance.

Figure 17:
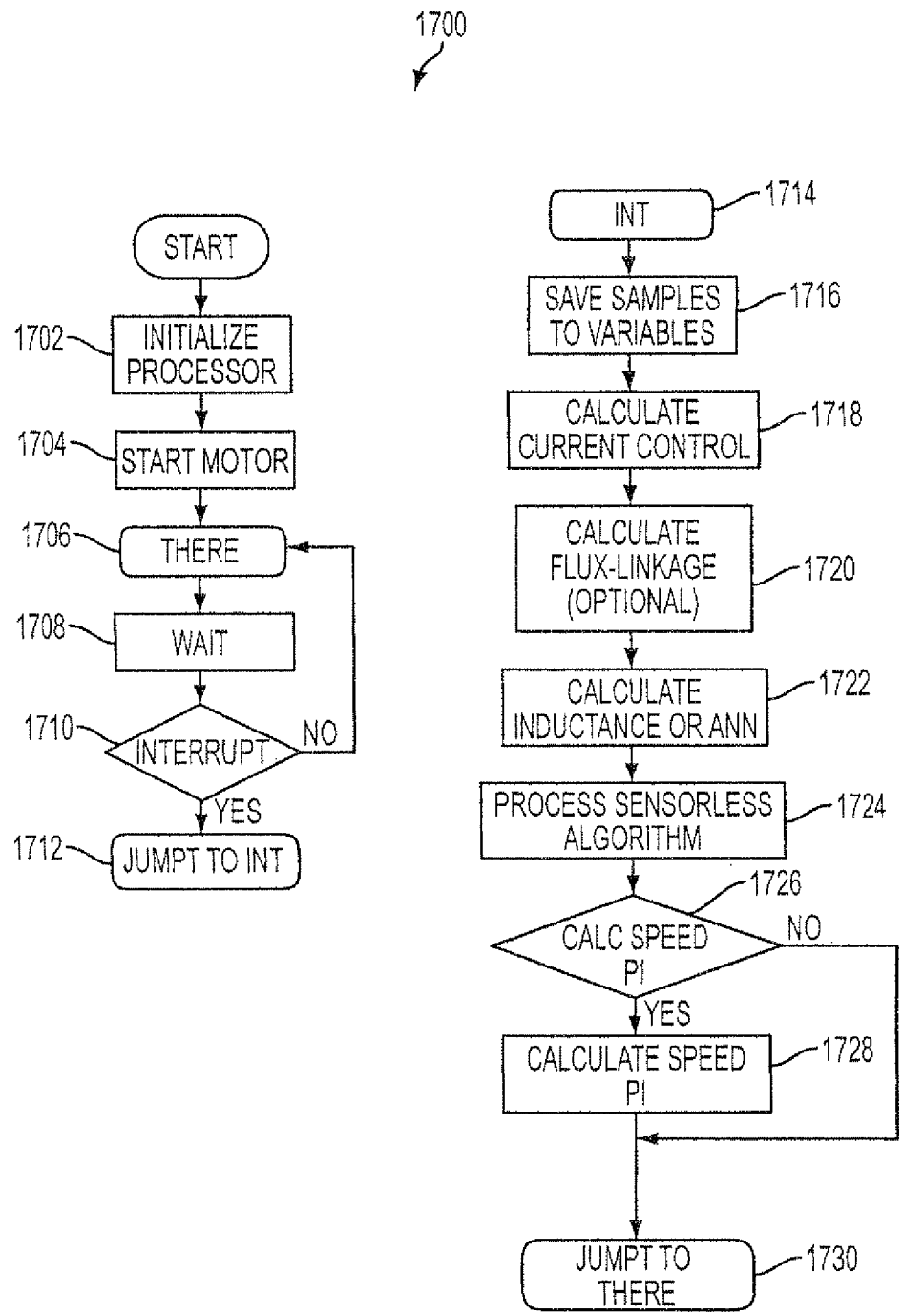
FIG. 17 illustrates a method of implementing the algorithms illustrated in FIGS. 11, 13, and 15 via firmware in a microprocessor or digital signal processor of the controller illustrated in FIG. 8.

FIG. 17 illustrates a method of implementing the algorithms illustrated in FIGS. 11, 13, and 15 via firmware in a microprocessor or digital signal processor of controller 802. The processor firmware implements the algorithm calculations on a repetitive interrupt basis. Controlled automatically by the processor, an interrupt service routine can be written to sequentially control the current and speed loops while performing any necessary calculations, estimations, or decisions. The software routine calculates current commands based on current samples and adjusts a PWM duty cycle. The sensor-less algorithm determines whether that PWM is allowed to run or whether is should be turned off.

Referring now to FIG. 17, controller 802's processor initializes 1702 the program variables for the start of motor operation and motor 806 is started 1704. Execution proceeds to program label. THERE 1706 where program execution waits 1708 for a timed interrupt to occur. When the timed interrupt is determined 1710 to occur, program execution jumps 1712 to program label INT 1714.

Upon jumping 1712 to label INT 1714, program execution saves 1716 samples of the monitored parameters used to control the motor's operation. From these samples, a current control parameter is calculated 1718, the flux-linkage may be calculated 1720, the motor's estimated phase inductance or rotor-stator alignment is calculated 1722, and one of the sensor-less algorithms 1100, 1300, or 1500 is executed. Thereafter, a determination 1726 is made whether to calculate the rotor's speed. If determination 1726 is affirmative, then the rotor's speed is calculated 1728 and program execution jumps 1730 to program label THERE 1706. Otherwise, program execution jumps 1730 to program label THERE 1706 without calculating the rotor's rotational speed.

The foregoing description illustrates and describes the present invention. However, the disclosure shows and describes only the preferred embodiments of the invention, but it is to be understood that the invention is capable of use in various other combinations, modifications, and environments. Also, the invention is capable of change or modification, within the scope of the inventive concept, as expressed herein, that is commensurate with the above teachings and the skill or knowledge of one skilled in the relevant art.

The embodiments described herein are further intended to explain best modes known of practicing, the invention and to enable others skilled in the art to utilize the invention in these and other embodiments, with the various modifications that may be required by the particular applications or uses of the invention. Accordingly, the description is not intended to limit the invention to the form disclosed herein.

What is claimed is:

1. A method for controlling a motor, the method comprising:
   (a) estimating the motor's region of operation;
   (b) energizing a phase winding of the motor when the region of operation is estimated to be a region for applying motoring torque;
   (c) determining whether the motoring torque region of operation has been errantly estimated;
   (d) discontinuing the energization of the motor phase winding when the estimated motoring torque region of operation is determined to be errant; and
   (e) repeating operations (a)-(d) to improve the synchronization between the initial energization of the motor phase winding for a phase cycle and the motor rotor's earliest position for receiving motoring torque in the phase cycle.

2. The method of claim 1, further comprising, after achieving improved synchronization, withholding energization of the motor phase winding for a period substantially equal to that for which the phase winding is energized in the phase cycle.

3. A method for controlling a motor, the method comprising:

(a) estimating the motor's region of operation;
(b) energizing a phase winding of the motor when the region of operation is estimated to be a region for applying motoring torque;
(c) determining whether the motoring torque region of operation has been errantly estimated;
(d) discontinuing the energization of the motor phase winding when the estimated motoring torque region of operation is determined to be errant;
(e) revising the estimate of the motor's region of operation to reflect a regeneration region of operation when the estimated motoring torque region of operation is determined to be errant; and
(f) withholding energization of the phase winding during a period when the regeneration region of operation is estimated.

4. A method for controlling a motor, the method comprising:
(a) estimating the motor's region of operation;
(b) energizing a phase winding of the motor when the region of operation is estimated to be a region for applying motoring torque;
(c) determining whether the motoring torque region of operation has been errantly estimated;
(d) discontinuing the energization of the motor phase winding when the estimated motoring torque region of operation is determined to be errant;
(e) revising the estimate of the motor's region of operation to reflect a regeneration region of operation for the motor having a period that is half the period estimated for a combined motoring torque region of operation and regeneration region of operation; and
(f) withholding energization of the phase winding during a period when the regeneration region of operation is estimated.

5. A method for controlling a motor, the method comprising:
(a) estimating the motor's region of operation;
(b) energizing a phase winding of the motor when the region of operation is estimated to be a region for applying motoring torque;
(c) determining whether the motoring torque region of operation has been errantly estimated; and
(d) discontinuing the energization of the motor phase winding when the estimated motoring torque region of operation is determined to be errant, wherein
the motoring torque region of operation is determined to be errantly estimated if a negative change in estimates of the motor's flux-linkage or phase winding inductance occurs with time.

6. A method for controlling a motor, the method comprising:
(a) estimating the motor's region of operation;
(b) energizing a phase winding of the motor when the region of operation is estimated to be a region for applying motoring torque;
(c) determining whether the motoring torque region of operation has been errantly estimated; and
(d) discontinuing the energization of the motor phase winding when the estimated motoring torque region of operation is determined to be errant, wherein:
the motoring torque region of operation is determined to be errantly estimated if an estimate of the motor's flux-linkage or phase winding inductance exceeds a reference value corresponding to:
(i) an expected amount of current applied in the energization of the phase winding, or
(ii) a monitored indication of the current flowing through the phase winding.

7. A method for controlling a motor, the method comprising:
(a) estimating the motor's region of operation;
(b) energizing a phase winding of the motor when the region of operation is estimated to be a region for applying motoring torque;
(c) determining whether the motoring torque region of operation has been errantly estimated; and
(d) discontinuing the energization of the motor phase winding when the estimated motoring torque region of operation is determined to be errant, wherein
the motoring torque region of operation is determined to be errantly estimated if a change, with time, in estimates of the motor's rotor position with respect to the stator provides an indication that the motor's flux-linkage or phase winding inductance is decreasing.

8. A method for controlling a motor, the method comprising:
(a) estimating the motor's region of operation;
(b) energizing a phase winding of the motor when the region of operation is estimated to be a region for applying motoring torque;
(c) determining whether the motoring torque region of operation has been errantly estimated; and
(d) discontinuing the energization of the motor phase winding when the estimated motoring torque region of operation is determined to be errant, wherein
the determination of whether the motoring torque region of operation has been errantly estimated is based upon a comparison of: (1) a relationship between the energization applied to the motor phase winding and the motor's response to the applied energization and (2) an expected relationship between a particular energization applied to the motor phase winding and the motor's response to the particular energization for each of a plurality of different operating points defined by the motor's rotational speed, load, and operational environment.

9. The method of claim 8, further comprising controlling the energization of a main phase winding of the motor, for each of the operating points, so as to realize the expected relationship between the particular energization control and the motor's response thereto.

10. A system for controlling a motor, the system comprising:
an estimation component that estimates the motor's region of operation;
an energization component that energizes a phase winding of the motor when the region of operation is estimated to be a region for applying motoring torque; and
a determination component that determines whether the motoring torque region of operation has been errantly estimated, wherein:
the energization component discontinues energizing the motor phase winding when the estimated motoring torque region of operation is determined to be errant, and
the system components cooperate through repeated estimates of the motor's region of operation to improve the synchronization between the initial energization of the motor phase winding for a phase cycle and the motor rotor's earliest position for receiving motoring torque in the phase cycle.

11. The system of claim 10, wherein, after achieving improved synchronization, the system components cooperate to withhold energization of the motor phase winding for a period substantially equal to that for which the phase winding is energized in the phase cycle.

12. A system for controlling a motor, the system comprising:
an estimation component that estimates the motor's region of operation;
an energization component that energizes a phase winding of the motor when the region of operation is estimated to be a region for applying motoring torque; and
a determination component that determines whether the motoring torque region of operation has been errantly estimated, wherein:
the energization component discontinues energizing the motor phase winding when the estimated motoring torque region of operation is determined to be errant, and
the system components cooperate to:
revise the estimate of the motor's region of operation to reflect a regeneration region of operation when the estimated motoring torque region of operation is determined to be errant; and
withhold energization of the phase winding during a period when the regeneration region of operation is estimated.

13. A system for controlling a motor, the system comprising:
an estimation component that estimates the motor's region of operation;
an energization component that energizes a phase winding of the motor when the region of operation is estimated to be a region for applying motoring torque; and
a determination component that determines whether the motoring torque region of operation has been errantly estimated, wherein:
the energization component discontinues energizing the motor phase winding when the estimated motoring torque region of operation is determined to be errant, and
the system components cooperate to:
revise the estimate of the motor's region of operation to reflect a regeneration region of operation for the motor having a period that is half the period estimated for a combined motoring torque region of operation and regeneration region of operation; and
withhold energization of the phase winding during a period when the regeneration region of operation is estimated.

14. A system for controlling a motor, the system comprising:
an estimation component that estimates the motor's region of operation;
an energization component that energizes a phase winding of the motor when the region of operation is estimated to be a region for applying motoring torque; and
a determination component that determines whether the motoring torque region of operation has been errantly estimated, wherein:
the energization component discontinues energizing the motor phase winding when the estimated motoring torque region of operation is determined to be errant, and
the motoring torque region of operation is determined to be errantly estimated if a negative change in estimates of the motor's flux-linkage or phase winding inductance occurs with time.

15. A system for controlling a motor, the system comprising:
an estimation component that estimates the motor's region of operation;
an energization component that energizes a phase winding of the motor when the region of operation is estimated to be a region for applying motoring torque; and
a determination component that determines whether the motoring torque region of operation has been errantly estimated, wherein:
the energization component discontinues energizing the motor phase winding when the estimated motoring torque region of operation is determined to be errant, and
the motoring torque region of operation is determined to be errantly estimated if an estimate of the motor's flux-linkage or phase winding inductance exceeds a reference value corresponding to:
(i) an expected amount of current applied in the energization of the phase winding, or
(ii) a monitored indication of the current flowing through the phase winding.

16. A system for controlling a motor, the system comprising:
an estimation component that estimates the motor's region of operation;
an energization component that energizes a phase winding of the motor when the region of operation is estimated to be a region for applying motoring torque; and
a determination component that determines whether the motoring torque region of operation has been errantly estimated, wherein:
the energization component discontinues energizing the motor phase winding when the estimated motoring torque region of operation is determined to be errant, and
the motoring torque region of operation is determined to be errantly estimated if a change, with time, in estimates of the motor's rotor position with respect to the stator provides an indication that the motor's flux-linkage or phase winding inductance is decreasing.

17. A system for controlling a motor, the system comprising:
an estimation component that estimates the motor's region of operation;
an energization component that energizes a phase winding of the motor when the region of operation is estimated to be a region for applying motoring torque; and
a determination component that determines whether the motoring torque region of operation has been errantly estimated, wherein:
the energization component discontinues energizing the motor phase winding when the estimated motoring torque region of operation is determined to be errant, and
determination of whether the motoring torque region of operation has been errantly estimated is based upon a comparison of: (1) a relationship between the energization applied to the motor phase winding and the motor's response to the applied energization and (2) an expected relationship between a particular energization applied to the motor phase winding and the motor's response to the particular energization for each of a plurality of different operating points defined by the motor's rotational speed, load, and operational environment.

18. The system of claim 17, further comprising a control component that controls energization applied, by the energization component, to a main phase winding of the motor, for each of the operating points, to realize the expected relationship between the particular energization control and the motor's response thereto.

* * * * *